US009256459B2

(12) United States Patent
Sasaki et al.

(10) Patent No.: US 9,256,459 B2
(45) Date of Patent: Feb. 9, 2016

(54) INFORMATION PROCESSING APPARATUS, WORKFLOW GENERATING SYSTEM, AND WORKFLOW GENERATING METHOD

(71) Applicants: Tomohiko Sasaki, Tokyo (JP); Sachiko Takata, Tokyo (JP); Ikuo Inouchi, Kanagawa (JP); Taijirou Sueishi, Kanagawa (JP); Hiroshi Morikawa, Kanagawa (JP); Akiko Bamba, Tokyo (JP)

(72) Inventors: Tomohiko Sasaki, Tokyo (JP); Sachiko Takata, Tokyo (JP); Ikuo Inouchi, Kanagawa (JP); Taijirou Sueishi, Kanagawa (JP); Hiroshi Morikawa, Kanagawa (JP); Akiko Bamba, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 287 days.

(21) Appl. No.: 13/909,287

(22) Filed: Jun. 4, 2013

(65) Prior Publication Data

US 2013/0326526 A1 Dec. 5, 2013

(30) Foreign Application Priority Data

Jun. 5, 2012 (JP) .................................. 2012-128222

(51) Int. Cl.
*G06F 9/46* (2006.01)
*G06F 3/12* (2006.01)

(52) U.S. Cl.
CPC ................ *G06F 9/46* (2013.01); *G06F 3/1205* (2013.01); *G06F 3/1275* (2013.01); *G06F 3/1282* (2013.01)

(58) Field of Classification Search
None
See application file for complete search history.

(56) References Cited

U.S. PATENT DOCUMENTS

| | | | |
|---|---|---|---|
| 5,999,911 A * | 12/1999 | Berg et al. ..................... 705/7.26 |
| 6,633,398 B1 | 10/2003 | Morikawa |
| 6,952,542 B1 | 10/2005 | Morikawa |
| 8,441,665 B2 * | 5/2013 | Matsuda ....................... 358/1.15 |
| 8,817,303 B2 * | 8/2014 | Fujii ............................. 358/1.15 |
| 2002/0126152 A1 | 9/2002 | Morikawa |
| 2002/0138543 A1 * | 9/2002 | Teng et al. ..................... 709/102 |
| 2002/0138577 A1 * | 9/2002 | Teng et al. ..................... 709/205 |
| 2002/0152254 A1 * | 10/2002 | Teng ............................. 709/100 |
| 2002/0161823 A1 * | 10/2002 | Casati et al. ................... 709/202 |
| 2003/0177046 A1 * | 9/2003 | Socha-Leialoha ................ 705/7 |
| 2003/0184802 A1 | 10/2003 | Morikawa |
| 2004/0057077 A1 | 3/2004 | Morikawa |
| 2004/0064786 A1 * | 4/2004 | Ikeda et al. .................... 715/500 |
| 2004/0078373 A1 * | 4/2004 | Ghoneimy et al. ............. 707/10 |
| 2004/0080770 A1 | 4/2004 | Hirose et al. |
| 2004/0117795 A1 * | 6/2004 | Wang et al. .................... 718/106 |

(Continued)

FOREIGN PATENT DOCUMENTS

| | | |
|---|---|---|
| JP | 06-012250 | 1/1994 |
| JP | 07-056725 | 3/1995 |

(Continued)

*Primary Examiner* — Emerson Puente
*Assistant Examiner* — Mehran Kamran
(74) *Attorney, Agent, or Firm* — Oblon, McClelland, Maier & Neustadt, L.L.P.

(57) ABSTRACT

An information processing apparatus for generating a workflow including one or more steps each indicating a process to be executed, includes a workflow display unit configured to display, on a display, one or more graphical representations corresponding to one or more steps of the workflow; a step management unit configured to obtain attribute data associated with a step to be added in response to an instruction for adding the step to the workflow; and an auxiliary indication control unit configured to cause the display to display a graphical representation corresponding to the step to be added and a graphical representation that reflects the attribute data.

14 Claims, 20 Drawing Sheets

(56) References Cited

U.S. PATENT DOCUMENTS

| | | |
|---|---|---|
| 2004/0135810 A1 | 7/2004 | Morikawa |
| 2004/0189705 A1 | 9/2004 | Morikawa |
| 2004/0208676 A1 | 10/2004 | Ishii et al. |
| 2005/0216862 A1 | 9/2005 | Shinohara et al. |
| 2005/0238377 A1 | 10/2005 | Morikawa |
| 2006/0092471 A1 | 5/2006 | Morikawa |
| 2006/0110178 A1 | 5/2006 | Sasaki |
| 2006/0110179 A1 | 5/2006 | Sasaki |
| 2006/0120763 A1 | 6/2006 | Ishii et al. |
| 2006/0136833 A1* | 6/2006 | Dettinger et al. ............ 715/769 |
| 2006/0200371 A1* | 9/2006 | Spector et al. .................... 705/7 |
| 2006/0200476 A1* | 9/2006 | Gottumukkala et al. ..... 707/100 |
| 2007/0011037 A1* | 1/2007 | Demizu et al. .................... 705/7 |
| 2007/0136117 A1* | 6/2007 | Matsueda ......................... 705/7 |
| 2007/0150329 A1* | 6/2007 | Brook et al. ...................... 705/8 |
| 2007/0195386 A1 | 8/2007 | Shinohara et al. |
| 2007/0198845 A1* | 8/2007 | Morikawa .................... 713/182 |
| 2007/0234912 A1 | 10/2007 | Ishii et al. |
| 2007/0236708 A1* | 10/2007 | Jahn et al. ...................... 358/1.6 |
| 2008/0072172 A1 | 3/2008 | Shinohara et al. |
| 2008/0101822 A1 | 5/2008 | Sasaki |
| 2008/0126987 A1* | 5/2008 | Meschian et al. ............ 715/825 |
| 2008/0215978 A1 | 9/2008 | Bamba |
| 2008/0216005 A1* | 9/2008 | Bamba et al. ................. 715/765 |
| 2008/0229210 A1 | 9/2008 | Bamba |
| 2008/0229247 A1 | 9/2008 | Bamba |
| 2008/0244721 A1 | 10/2008 | Barrus et al. |
| 2009/0006997 A1* | 1/2009 | Jiang et al. .................... 715/771 |
| 2009/0187905 A1* | 7/2009 | Sijelmassi et al. ............ 718/100 |
| 2009/0201559 A1 | 8/2009 | Yamada et al. |
| 2009/0235173 A1* | 9/2009 | Ichihara ......................... 715/733 |
| 2010/0070464 A1* | 3/2010 | Aymeloglu et al. ........... 707/608 |
| 2010/0077260 A1* | 3/2010 | Pillai et al. ...................... 714/46 |
| 2010/0123916 A1* | 5/2010 | Tamura .......................... 358/1.9 |
| 2011/0052257 A1 | 3/2011 | Sasaki |
| 2011/0071869 A1* | 3/2011 | O'Brien et al. .................... 705/7 |
| 2011/0179371 A1* | 7/2011 | Kopycinski et al. .......... 715/772 |
| 2011/0191440 A1 | 8/2011 | Morikawa |
| 2011/0276915 A1* | 11/2011 | Freire et al. .................... 715/772 |
| 2012/0109701 A1* | 5/2012 | Seugling et al. ............ 705/7.13 |
| 2013/0185240 A1* | 7/2013 | Ward et al. ..................... 706/47 |
| 2013/0311927 A1* | 11/2013 | Grossman et al. ............ 715/771 |
| 2014/0032606 A1* | 1/2014 | Chandler et al. ............. 707/798 |

FOREIGN PATENT DOCUMENTS

| | | |
|---|---|---|
| JP | 07-191840 | 7/1995 |
| JP | 2004-151893 | 5/2004 |
| JP | 2008-112393 | 5/2008 |
| JP | 2009-116381 | 5/2009 |
| JP | 2010-134879 | 6/2010 |

* cited by examiner

FIG.7

| TYPE OF STEP | DOWNSTREAM SIDE CONNECTION ATTRIBUTE | UPSTREAM SIDE CONNECTION ATTRIBUTE | |
|---|---|---|---|
| A | CONNECTION INDISPENSABLE | CONNECTABLE | B, C |
| | | UNCONNECTABLE | D, E |
| B | CONNECTION POSSIBLE | CONNECTABLE | A, C, D |
| | | UNCONNECTABLE | E |
| C | CONNECTION IMPOSSIBLE | CONNECTABLE | A |
| | | UNCONNECTABLE | B, D, E |
| D | CONNECTION INDISPENSABLE | CONNECTABLE | A, E |
| | | UNCONNECTABLE | B, C |
| E | CONNECTION POSSIBLE | CONNECTABLE | B, C, D |
| | | UNCONNECTABLE | A |

FIG.17

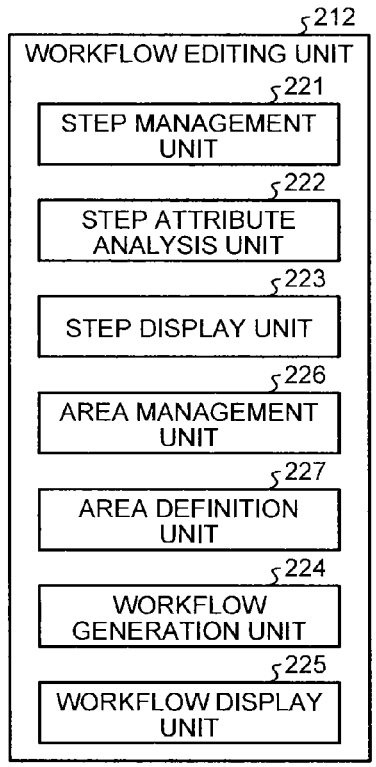

FIG.18

| AREA ID | AREA NAME | AREA INFORMATION |
|---|---|---|
| 1 | Recieve | AREA THAT INCLUDE STEP GROUP POSITIONED MOST UPSTREAM IN WORKFLOW AND IN WHICH PROCESSING RELATING TO RECEIVING IS PERFORMED |
| 2 | Prepare | AREA THAT INCLUDE STEP GROUP POSITIONED SECOND IN WORKFLOW AND IN WHICH PROCESSING RELATING TO PRELIMINARY PREPARATION OF PRINTING IS PERFORMED |
| 3 | Print | AREA THAT INCLUDE STEP GROUP POSITIONED THIRD IN WORKFLOW AND IN WHICH PROCESSING RELATING TO PRINTING IS PERFORMED |
| 4 | Complete | AREA THAT INCLUDE STEP GROUP POSITIONED MOST DOWNSTREAM IN WORKFLOW AND IN WHICH PROCESSING RELATING TO COMPLETION PROCEDURE IS PERFORMED |

FIG.20

| TYPE OF STEP | DOWNSTREAM SIDE CONNECTION ATTRIBUTE | | UPSTREAM SIDE CONNECTION ATTRIBUTE | | | | |
|---|---|---|---|---|---|---|---|
| | | CONNECTIVITY IN IDENTICAL AREA | AREA ID | 1 | 2 | 3 | 4 |
| A | CONNECTION INDISPENSABLE | CONNECTABLE | CONNECTABLE | B, C | C, D | D, E | B, E |
| | | | UNCONNECTABLE | D, E | B, E | B, C | C, D |
| B | CONNECTION POSSIBLE | — | CONNECTABLE | A, C, D | A, D, E | A, C, E | C, D, E |
| | | | UNCONNECTABLE | E | C | D | A |
| C | CONNECTION IMPOSSIBLE | — | CONNECTABLE | A | B | D | E |
| | | | UNCONNECTABLE | B, D, E | A, D, E | A, B, E | A, B, D |
| D | CONNECTION INDISPENSABLE | UNCONNECTABLE | CONNECTABLE | A, E | A, B | A, C | C, E |
| | | | UNCONNECTABLE | B, C | C, E | B, E | A, B |
| E | CONNECTION POSSIBLE | — | CONNECTABLE | B, C, D | A, C, D | B, D, E | A, B, C |
| | | | UNCONNECTABLE | A | B | C | D |

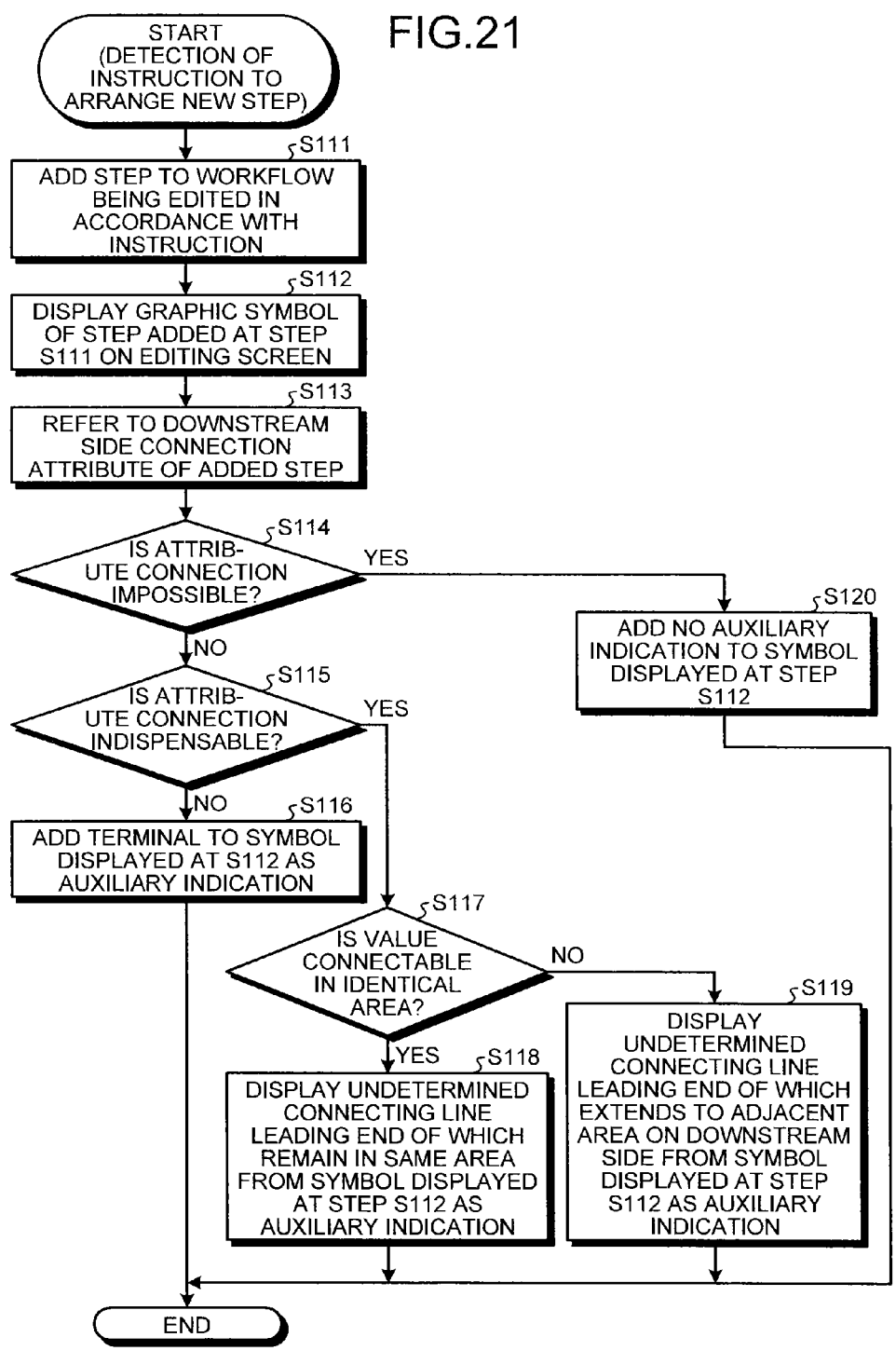

INFORMATION PROCESSING APPARATUS, WORKFLOW GENERATING SYSTEM, AND WORKFLOW GENERATING METHOD

CROSS-REFERENCE TO RELATED APPLICATION

The present application claims priority to and incorporates by reference the entire contents of Japanese Patent Application No. 2012-128222 filed in Japan on Jun. 5, 2012.

BACKGROUND OF THE INVENTION

1. Field of the Invention

The present invention relates to an information processing apparatus, a workflow generating system, and a workflow generating method.

2. Description of the Related Art

Patterned processing has been performed in a semiautomatic manner by apparatuses that execute workflows, in which a plurality of steps each indicating a process are connected with connecting lines, produced using application software. For example, in a field of large volume printing called production printing, the workflow is used for processing document data received from customers, for setting of any print setting, and for performing printing using any printer. In this case, the processing from receiving of document data to completion of printing can be performed in a semiautomatic manner.

Known techniques for editing such a workflow are disclosed in Japanese Patent Application Laid-open No. 2004-151893, Japanese Patent Application Laid-open No. 2009-116381, and Japanese Patent Application Laid-open No. H7-191840, for example. Japanese Patent Application Laid-open No. 2004-151893 discloses a technique in which executable service icons are displayed on a graphic user interface (GUI) using a service list transmitted from a service searching server and a user creates a workflow using the service icons. In addition, a flow can be made in which services logically cooperate with each other using cooperation processing patterns such as transition, branching, repetition, and stop.

Japanese Patent Application Laid-open No. 2009-116381 discloses a technique in which, when a bypass unit composed of a branching unit branching an execution flow into two flows and a merging unit merging the branching flows is inserted in a flowchart, the branching unit and the merging unit are inserted as a pair. Japanese Patent Application Laid-open No. H7-191840 discloses a technique in which, when a data flow is edited, a connecting terminal having a form corresponding to a type of data included in a program module is provided to a graphic symbol indicating the program module, suggesting to a user that the graphic symbols having the connecting terminals of the same form are connectable to each other.

Such conventional techniques, however, have a problem in that it is difficult for a user who edits a workflow to know whether another step is connectable to the step used for the editing of the workflow on a downstream side of the step. Particularly, when it is indispensable to connect a step on the downstream side but no step is connected, the execution of processing in the workflow produced by being edited returns an error. As a result, such a mistake drastically reduces working efficiency.

Therefore, there is a need to allow a user to readily create a workflow.

SUMMARY OF THE INVENTION

It is an object of the present invention to at least partially solve the problems in the conventional technology.

According to an embodiment, there is provided an information processing apparatus for generating a workflow including one or more steps each indicating a process to be executed. The apparatus includes a workflow display unit configured to display, on a display, one or more graphical representations corresponding to one or more steps of the workflow; a step management unit configured to obtain attribute data associated with a step to be added in response to an instruction for adding the step to the workflow; and an auxiliary indication control unit configured to cause the display to display a graphical representation corresponding to the step to be added and a graphical representation that reflects the attribute data.

According to another embodiment, there is provided a workflow generating system for generating a workflow including one or more steps each indicating a process to be executed. The system includes a server apparatus including a first processor, the first processor being one or more processors; and a client apparatus including a second processor, the second processor being one or more processors. At least one of the first processor and the second processor is configured to: display, on a display, one or more graphical representations corresponding to one or more steps of a workflow; obtain attribute data associated with a step to be added in response to an instruction for adding the step to the workflow; and display, on the display, a graphical representation corresponding to the step to be added and a graphical representation that reflects the attribute data.

According to still another embodiment, there is provided a method of generating a workflow including one or more steps each indicating a process to be executed. The method includes displaying, on a display, one or more graphical representations corresponding to one or more steps of a workflow; receiving an instruction for adding a step to the workflow; and displaying, on the display, a graphical representation corresponding to the step to be added and a graphical representation that reflects attribute data, the attribute data being associated with the step to be added.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic diagram illustrating an example of a step type management table;

FIG. 17 is a schematic diagram illustrating a functional structure of the workflow editing unit of the server in a second embodiment of the present invention and corresponding to FIG. 4;

FIG. 18 is a schematic diagram illustrating an example of an area information table;

FIG. 20 is a schematic diagram illustrating an example of the step type management table in the second embodiment;

FIG. 21 is a flowchart of processing when an instruction to arrange a new step in the workflow is detected in the second embodiment;

DETAILED DESCRIPTION OF THE PREFERRED EMBODIMENTS

Figure 1:
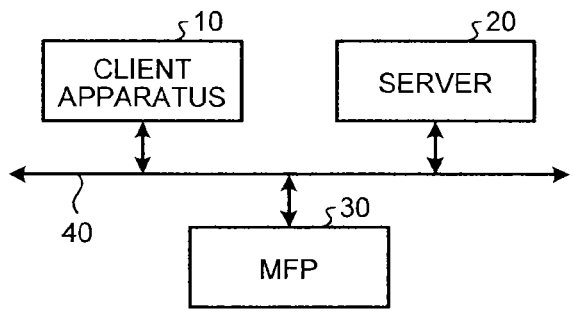
FIG. 1 is a schematic diagram illustrating a structure of a system including a server that is a first embodiment of an information processing apparatus.

Embodiments of the invention are specifically described below with reference to the accompanying drawings.
First Embodiment A first embodiment is described below. FIG. 1 is a schematic diagram illustrating a structure of a system including a server in the first embodiment of an information processing apparatus of the invention.

The system illustrated in FIG. 1 includes a client apparatus 10, a server 20, and a multi function printer (MFP) 30, which are connected to each other through a network 40. Any communication protocol of both wired and wireless communication protocols can be used in the network 40.

The client apparatus 10 has a function to allow a user to edit a workflow by operating the client apparatus 10 by accessing the server 20 to use the server 20's functions for editing of the workflow. The client apparatus 10 also has a function to instruct the server 20 to execute processing based on a pre-designated workflow (function to input a job to the server 20) in accordance with the operation of a user.

In the workflow, a plurality of steps each indicating a process are connected with connecting lines so as to be combined. When the processing based on the workflow is executed, processing of the respective steps is sequentially executed from the first step toward the steps on the downstream side of the first step in accordance with the connecting lines. In principle, the processing of the respective steps is executed by sequentially receiving and passing the data to be processed such that the execution result of the step on the upstream side is further processed by the step on the downstream side.

The server 20 has functions to edit, save, and manage the workflow. The server 20 also has a function to execute the processing based on a pre-designated workflow in accordance with an instruction from an external apparatus such as the client apparatus 10. This "processing" may be executed by the server 20. The server 20 may cause an external apparatus, such as the MFP 30, to execute the "processing".

The MFP 30 is an image processing apparatus that has functions to scan an image of a document, form (print) an image on a sheet material such as paper, exchange data such as image information by facsimile communication or network communication, and store the data. The MFP 30 can execute processing relating to such functions in accordance with an instruction from the server 20. A user can operate the MFP 30 directly.

Figure 2:
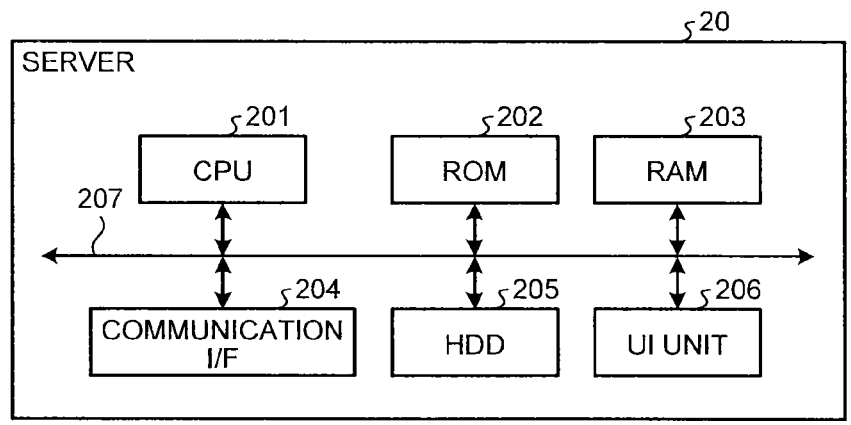
FIG. 2 is a schematic diagram illustrating a hardware structure of the server illustrated in FIG. 1.

FIG. 2 illustrates a hardware structure of the server 20. The server 20 may be a known computer, which serves as the hardware thereof. In the embodiment, as illustrated in FIG. 2, the server 20 includes a central processing unit (CPU) 201, a read only memory (ROM) 202, a random access memory (RAM) 203, a communication interface (I/F) 204, a hard disc drive (HDD) 205, and a user interface (UI) unit 206, which are connected to each other through a system bus 207.

Various functions, which are described later, can be achieved by the CPU 201 executing programs stored in the ROM 202 or the HDD 205 using the RAM 203 as a working area. The communication I/F 204 is an interface to perform communication through the network 40.

The UI unit 206 is an operation unit that receives operation of a user or a display unit that provides information to a user. An external operation unit or an external display unit also can be used. The UI unit 206 may receive operation of a user by receiving data indicating the content of the operation from an external apparatus such as the client apparatus 10. The UI unit 206 may provide information to a user by transmitting data indicating the display content of a screen or data to be displayed on a screen to an external apparatus.

The client apparatus 10 may also be a known computer, which serves as the hardware thereof. The client apparatus 10 can employ the same structure as the server 20. The detailed description thereof is thus omitted. The MFP 30 includes an engine unit that scans an image of a document, forms an image on a sheet, and performs facsimile communication if necessary in addition to a CPU, a ROM, a RAM, a communication I/F, an HDD, and a UI unit that are included therein and have the same functions as the corresponding ones in the server 20. The MFP 30 may also be a known computer, which serves as the hardware thereof. The detailed description thereof is thus omitted.

Figure 3:
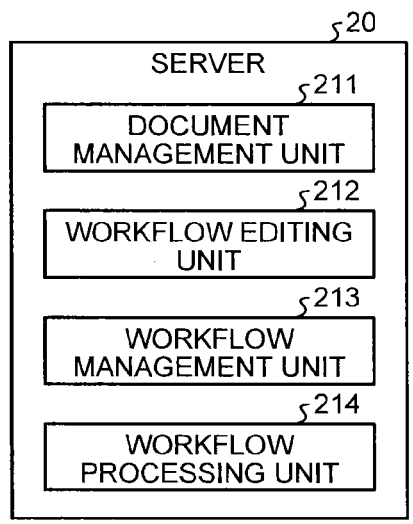
FIG. 3 is a schematic diagram illustrating a functional structure of the server illustrated in FIG. 1.

FIG. 3 illustrates a functional structure of the server 20. As illustrated in FIG. 3, the server 20 includes a document management unit 211, a workflow editing unit 212, a workflow management unit 213, and a workflow processing unit 214. The document management unit 211 has a function to manage data of a document to be processed in accordance with the workflow. The data of the document may be passed from an origin of a request to the server 20 to execute processing (e.g., the client apparatus 10) as a processing target, may be the data obtained by instructing the MFP 30 to scan a document, or may be the data obtained by processing them.

The workflow editing unit 212 has a function of a workflow editor that produces and edits the workflow in accordance with the instruction of a user. The workflow management unit 213 has a function to save the workflow edited by the workflow editing unit 212, and call and manage the saved workflow.

The workflow processing unit 214 has a function to execute processing in accordance with the workflow that is edited by the workflow editing unit 212 or called by the workflow management unit 213. As described above, this "processing" may be executed by the server 20 or the server 20 may cause an external apparatus, such as the MFP 30, to execute the "processing".

Figure 4:
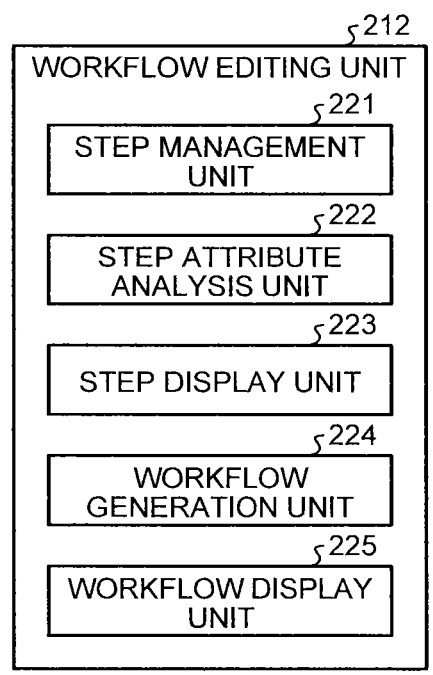
FIG. 4 is a schematic diagram illustrating in more detail a functional structure of a workflow editing unit illustrated in FIG. 3.

FIG. 4 illustrates in more detail a functional structure of the workflow editing unit 212 illustrated in FIG. 3. As illustrated in FIG. 4, the workflow editing unit 212 includes a step management unit 221, a step attribute analysis unit 222, a step display unit 223, a workflow generation unit 224, and a workflow display unit 225.

The step management unit 221 has a function to manage types of steps that can be arranged in the workflow using a step type management table illustrated in FIG. 7, for example. The step attribute analysis unit 222 has a function to analyze, when an instruction is made to arrange the step in the workflow or an instruction to connect the steps arranged in the workflow with the connecting line, the attributes and the arrangement of the steps related to the instruction for performing the arrangement and the connection so as to meet the instruction. The analysis of the attribute of the step can be done with reference to the information of the type of step managed by the step management unit 221.

The step display unit 223 is a display control unit that has a function to display graphic symbols, which serve as display parts indicating the steps and the connecting lines arranged in the workflow, on an editing screen for editing the workflow. The step display unit 223 also has a function to produce data necessary for an external apparatus, such as the client apparatus 10, to display the editing screen and transmit the data to the external apparatus.

The workflow generation unit 224 is a workflow generation unit that has a function to produce workflow data specifying the content of the workflow in accordance with the instruction to arrange the step in the workflow or the instruction to connect the steps arranged in the workflow with the connecting line. The workflow data includes data specifying how many of which types of steps are included in the workflow and how the connecting line is connected, i.e., from which step to which step. The workflow data may include also a setting value of a parameter when it is necessary for each step to set the parameter used for executing the workflow.

The workflow display unit 225 is a display control unit that has a function to cause a display unit such as a display, to display the editing screen for editing the workflow. The contents displayed on the editing screen include the content of the workflow currently being edited. The workflow display unit 225 also has a function to produce data necessary for an external apparatus, such as the client apparatus 10, to display the editing screen and transmit the data to the external apparatus.

Figure 5:
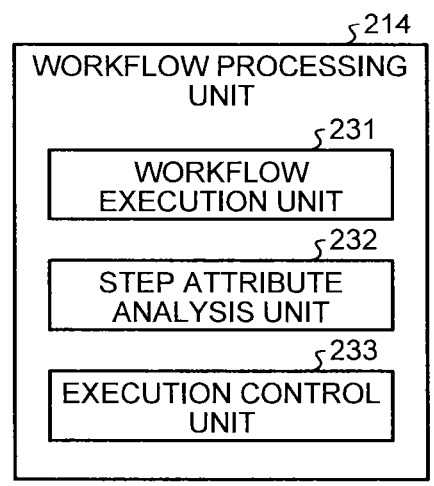
FIG. 5 is a schematic diagram illustrating in more detail a functional structure of a workflow processing unit illustrated in FIG. 3.

FIG. 5 illustrates in more detail a functional structure of the workflow processing unit 214 illustrated in FIG. 3. As illustrated in FIG. 5, the workflow processing unit 214 includes a workflow execution unit 231, a step attribute analysis unit 232, and an execution control unit 233.

The workflow execution unit 231 has a function to execute processing of each step in accordance with the workflow data of the workflow to be executed. The step attribute analysis unit 232 has a function to analyze the attribute of the step to be executed when the workflow execution unit 231 executes the processing. The analysis of the attribute of the step can be done with reference to the step type management table managed by the step management unit 221 illustrated in FIG. 4. The execution control unit 233 has a function to control the execution of the processing done by the workflow execution unit 231 for each step in accordance with the attribute of the step analyzed by the step attribute analysis unit 232.

Figure 6:
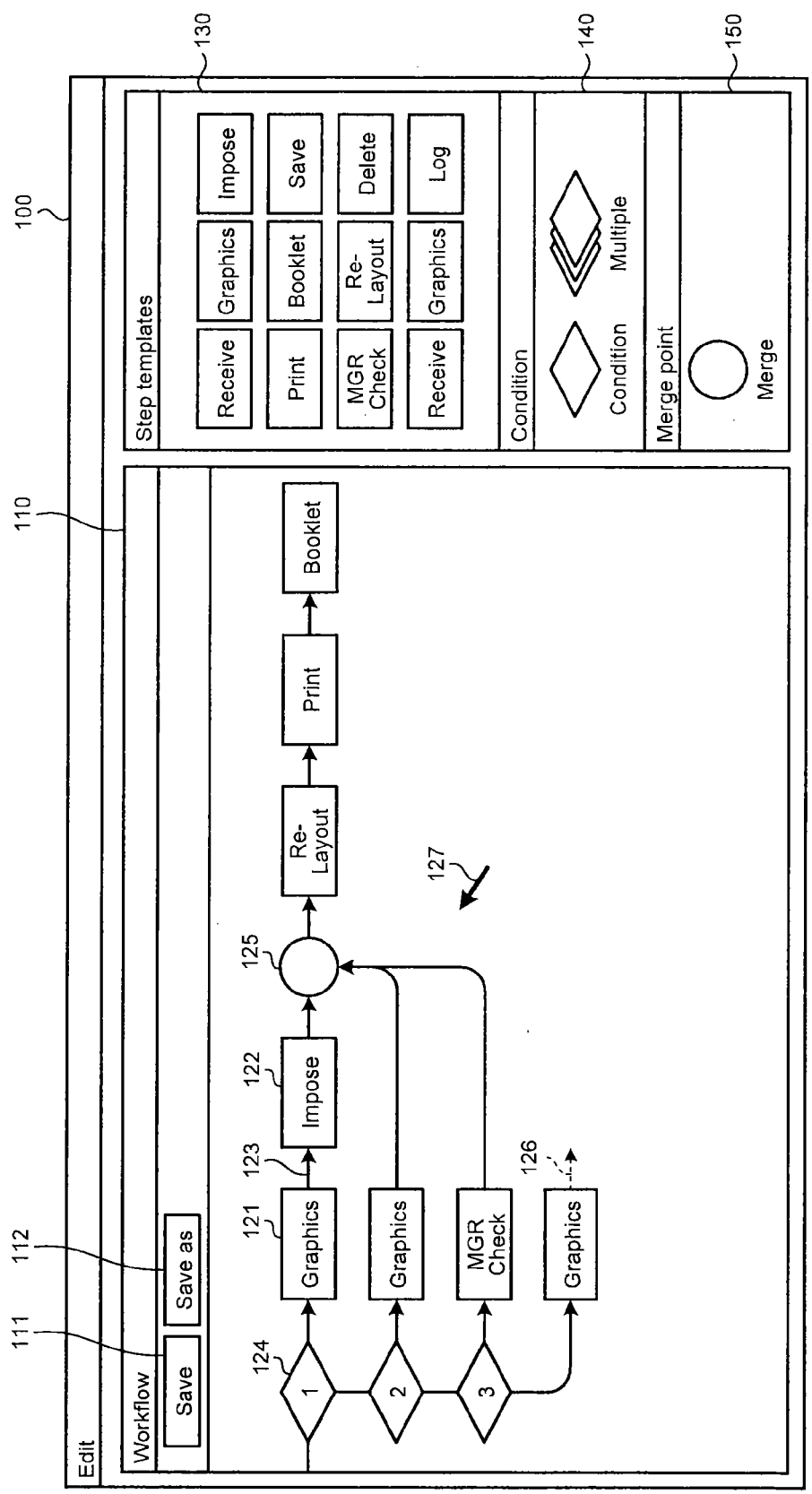
FIG. 6 is a schematic diagram illustrating an example of an editing screen for editing a workflow.

FIG. 6 illustrates an example of the editing screen for editing the workflow. An editing screen 100 illustrated in FIG. 6 is a graphic user interface (GUI) to be displayed by the function of the workflow editing unit 212 on a display of an apparatus requesting the server 20 to edit the workflow. The editing screen 100 has a function to receive an instruction relating to the editing of the workflow from a user and display the content of the workflow being edited. In the system illustrated in FIG. 1, the editing screen 100 is displayed on the display of the client apparatus 10.

The client apparatus 10 converts the content of the operation done by a user on the editing screen 100 into an appropriate command if necessary and transmits the content of the operation or the command to the server 20. The server 20 receives the content of the operation or the command as the instruction to edit the workflow and executes the processing relating to the editing of the workflow in accordance with the command. In this way, the CPU 201 of the server 20 functions as an operation receiving unit. The server 20 produces data necessary for the editing screen 100 to display the editing result and transmits the data to the client apparatus 10. The client apparatus 10 displays the editing screen 100 on the display on the basis of the received data.

The editing screen 100 includes a workflow window 110, a step window 130, a branch window 140, and a merging window 150. The workflow window 110 is an area in which the content (present state) of the workflow being edited is displayed. The workflow window 110 includes an overwrite-save button 111 used for making an instruction to overwrite and save the workflow being edited and a save button 112 used for making an instruction to save the workflow being edited as a new workflow.

In the workflow window 110, the content of the workflow being edited is displayed with the graphic symbols representing the steps and the graphic symbols indicating the connecting states between the steps, such as a branch, a merging, and a connection with a line.

In FIG. 6, graphic symbols 121 and 122 represent the steps. An arrow 123, which connects the steps 121 and 122, is the graphic symbol indicating the connecting line. When a branch occurs in the connection between the steps, a branching point 124 is interposed between the steps. The branching point 124 is connected to a plurality of steps serving as the branching destinations (or connected to another branching point) with the connecting lines.

When a merging occurs in the connection between the steps, a merging point 125 is interposed between the steps. The merging point 125 is connected to a plurality of steps serving as the merging origins with the connecting lines.

A graphic symbol 126 indicates an undetermined connecting line. This symbol is described later. A pointer 127 is used by a user for instructing various types of operations in the editing screen 100. The pointer 127 is moved in accordance with the operation of a pointing device by a user.

The step window 130 is an area in which the types of steps that can be arranged in the workflow are displayed. A user can instruct the addition of a step of which the type is indicated by the symbol to the workflow by dragging the symbol of the step displayed in the step window 130 and thereafter by dropping the symbol in the workflow window 110.

The branch window 140 is an area in which the branching points that can be arranged in the workflow are displayed. In the same manner as the addition of the step, a user can instruct the addition of a branching point to the workflow by the drag-and-drop operation. The merging window 150 is an area in which the merging points that can be arranged in the workflow are displayed. In the same manner as the addition of the step, a user can instruct the addition of a merging point to the workflow by the drag-and-drop operation.

One of the feature points in the embodiment is the processing when a new step is arranged in the workflow in the editing screen 100. The processing is described below. FIG. 7 illustrates an example of the step type management table that specifies a connection attribute of the step to be arranged in the workflow.

In the step type management table illustrated in FIG. 7, downstream side connection attributes and upstream side connection attributes are registered for the respective types of steps that can be arranged in the workflow. The downstream side connection attribute is a first connection attribute indicating a possibility that another step is connected to a certain step on the downstream side of the certain step. The upstream side connection attribute is a second connection attribute indicating the type of step connectable to a certain step on the upstream side of the certain step. In FIG. 7, five steps having different types of A to E are illustrated as the steps that can be arranged in the workflow for simple explanation.

The downstream side connection attribute has three values of "connection indispensable", "connection possible", and "connection impossible". For the type of step having a value of "connection indispensable" for the attribute, the connection on the downstream side of the step is indispensable, and if no step is connected on the downstream side, it is treated as an error. For example, the step executing data conversion is the type of step having a value of "connection indispensable" because if the conversion processing is completed in the step, data after the conversion has no destination for being further processed, thereby causing the processing not being normally performed.

For the type of step having a value of "connection possible" for the attribute, another step or no step may be connected on the downstream side of the step. For example, the step executing printing of one copy is the type of step having a value of "connection possible" because the step can end processing after only printing the copy, or a post-processing step such as staple processing can be arranged after the step. For the type of step having a value of "connection impossible" for the attribute, it is impossible to connect any step to the step on the downstream side of the step. For example, the step executing deleting of print job data is the type of step having a value of "connection impossible" because no data remains as the processing target if the processing is completed and no succeeding processing can be performed.

Listed as the upstream side connection attribute of a certain step are the types of steps connectable (are allowed to be connected to) to the certain step on the upstream side of the certain step and the types of steps unconnectable (are not allowed to be connected to) to the certain step on the upstream side of the certain step. The permission or non-permission of the connection may be determined on the basis of the outputs on the downstream side performed by the respective types of steps included in the step type management table. The type of step outputting data processable by a certain step is connectable to the certain step whereas the type of step outputting data unprocessable by a certain step is unconnectable to the certain step.

Such data included in the step type management table is preferably supplied by a vendor providing applications for achieving the functions of the workflow editing unit 212 as a part of the applications. The step type management table may be stored by the server 20 or may be stored in an external apparatus accessible from the server 20, such as another server provided by the vendor. The processing of managing the step type managing table corresponds to the functions of a process management unit and a step management unit. In the step type management table, data of the graphic symbols corresponding to the steps and programs corresponding to the steps may be registered, for example, in addition to the attributes illustrated in FIG. 7. The detailed descriptions thereof are omitted.

Figure 8:
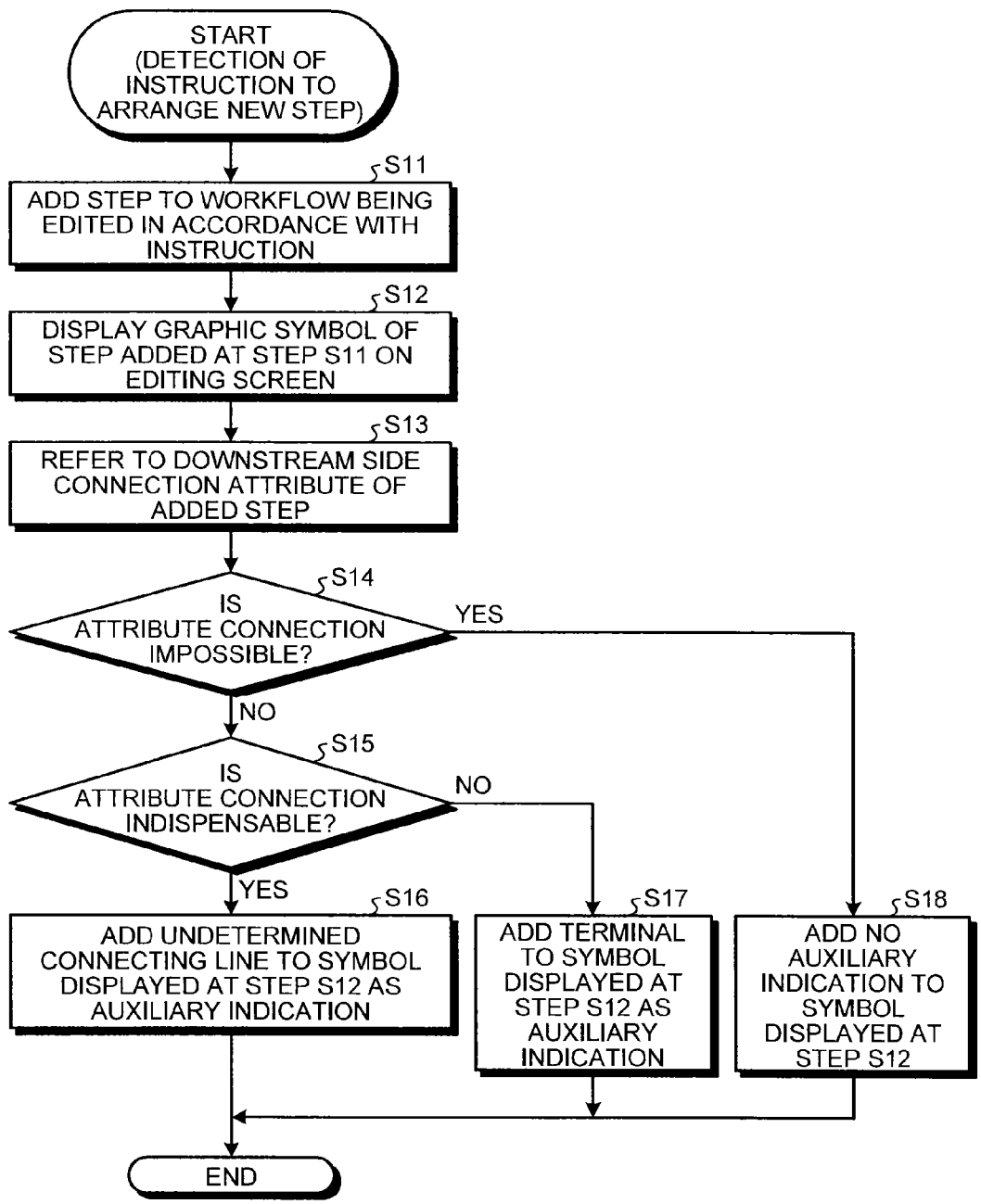
FIG. 8 is a flowchart of processing when an instruction to arrange a new step in the workflow is detected.

FIG. 8 illustrates a flowchart of the processing executed by the CPU 201 of the server 20 when an instruction is detected to arrange a new step in the workflow. In the following descriptions, the processing to cause the display of the apparatus operated by a user to display something in relation to the editing of the workflow is simply described that the server 20 "displays" something, for example. In the system of FIG. 1, the display is performed by the client apparatus 10. The processing performed by the server 20 is the transmission of data necessary for the display to the client apparatus 10. For simple explanation, this processing is described that the server 20 "displays" something. The server 20 may also display the screen.

The CPU 201 of the server 20 starts the processing illustrated in the flowchart of FIG. 8 when detecting the instruction to arrange a new step in the workflow in the editing screen 100 on the basis of the command received from the client apparatus 10, for example. At Step S11, the CPU 201 adds the step to the workflow being edited in accordance with the instruction. In this processing, the data of the type of step instructed to be arranged is added to the workflow data.

At Step S12, the CPU 201 displays the graphic symbol, which is the display part of the step added at Step S11 on the editing screen 100. At Step S13, the CPU 201 refers to the step type management table illustrated in FIG. 7 and acquires the value of the downstream side connection attribute of the step arranged in at Step S11. The attribute is set for each type of the steps as described above. At Step S14, the CPU 201 determines whether the value of the downstream side connection attribute is that of "connection impossible". If the determination result is "No", the CPU 201 determines whether the value of the downstream side connection attribute is that of "connection indispensable" at Step S15.

If the determination result at Step S15 is "Yes", the processing proceeds to Step S16, at which the CPU 201 adds an indication of the undetermined connecting line to the graphic symbol displayed at Step S12 as an auxiliary indication of the step having a value of "connection indispensable" for the downstream side connection attribute. If the determination result is "No" at Step S15, this means that the value of the downstream side connection attribute is that of "connection possible". The processing proceeds to Step S17, at which the CPU 201 adds an indication of a terminal to the graphic symbol displayed at Step S12 as an auxiliary indication of the step having a value of "connection possible" for the downstream side connection attribute.

If the determination result is "Yes" at Step S14, the processing proceeds to Step S18. This means that the value of the downstream side connection attribute is that of "connection impossible". The CPU 201 adds no auxiliary indication to the graphic symbol displayed at Step S12. After the completion of each processing at steps S16, S17, and S18, the CPU 201 ends the processing. In the processing described above, the processing at Step S13 onwards corresponds to the function of an auxiliary indication control unit.

Figure 9:
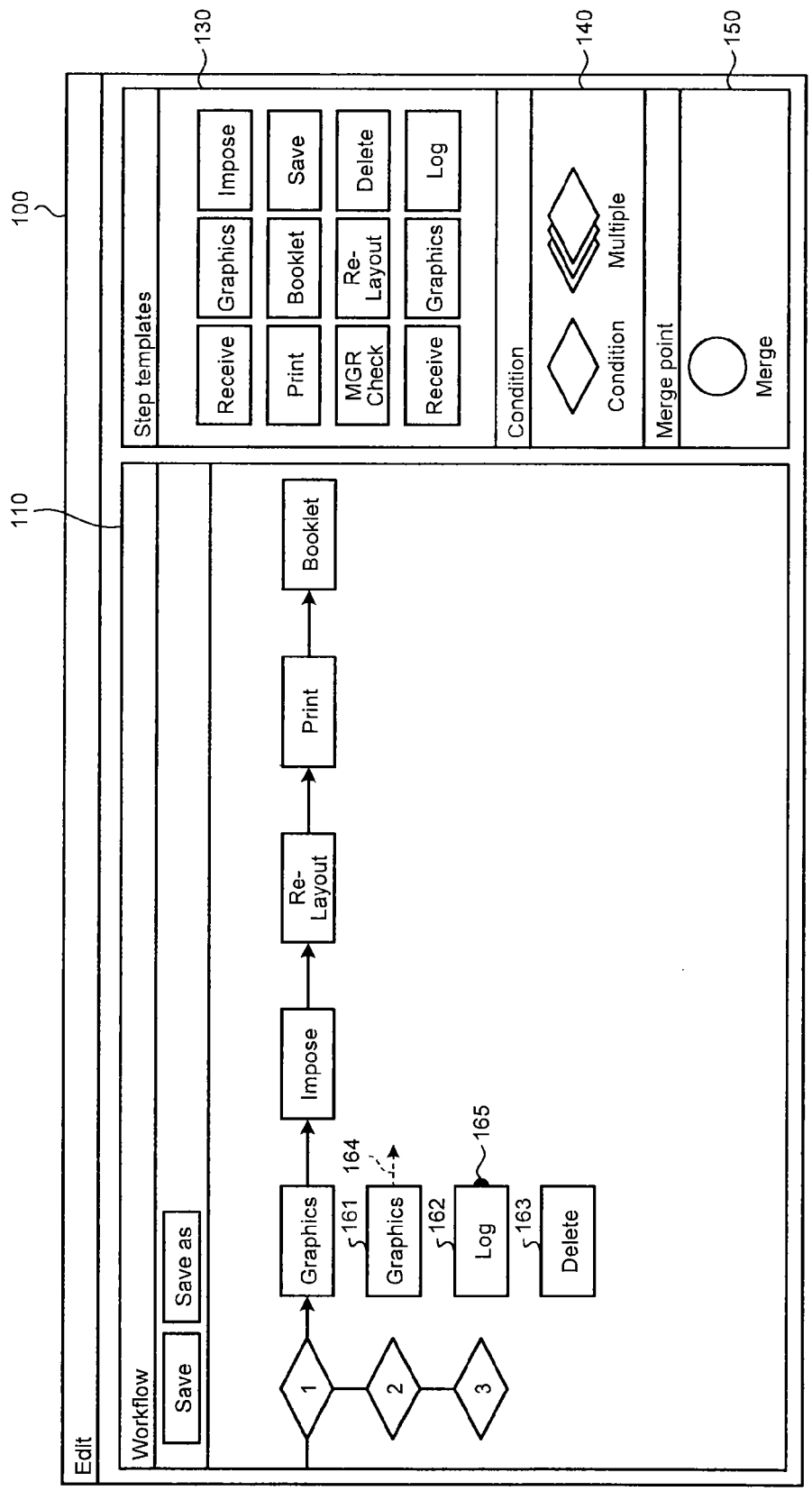
FIG. 9 is a schematic diagram illustrating examples of an auxiliary indication in the processing from steps S16 to S18 of FIG. 8.

FIG. 9 illustrates examples of the auxiliary indication in the processing from Step S16 to Step S18. FIG. 9 illustrates the state in which steps 161, 162, and 163 are sequentially newly arranged in the workflow. The value of the downstream side connection attribute of the step 161 is that of "connection indispensable". An undetermined connecting line 164 is added to the step 161 as the auxiliary indication. This undetermined connecting line 164 is the indication indicating that any step is required to be connected on the downstream side of the step 161. Such an indication with the arrow is useful for reminding a user that this indication requests the step to be surely connected to another step.

The value of the downstream side connection attribute of the step 162 is that of "connection possible". A terminal 165 is added to the step 162 as the auxiliary indication. This terminal 165 is the indication indicating that any step is connectable to the step 162 on the downstream side of the step 162. The value of the step 163 is that of "connection impossible". No auxiliary indication is added to the step 163. This (no auxiliary indication) is the indication indicating that it is impossible to connect any step to the step 163 on the downstream side of the step 163.

In this way, when a new step is added to the workflow by the processing of FIG. 8, the server 20 can cause the editing screen 100 to display the graphic symbol of the added step with the auxiliary indication corresponding to the value of the downstream side connection attribute of the added step. The auxiliary indication can provide whether another step is connectable to the step on the downstream side of the step or whether the connection is required to a user in a comprehensive manner. No auxiliary indication is considered as one of the auxiliary indications.

With reference to the auxiliary indication, a user can be prevented from leaving by mistake the step on the downstream side of which another step is required to be connected without any connection or attempting by mistake to connect another step to the step on the downstream side of which it is impossible to connect any step. As a result, an appropriate workflow can be readily produced and productivity in editing the workflow can be increased.

Figure 10:
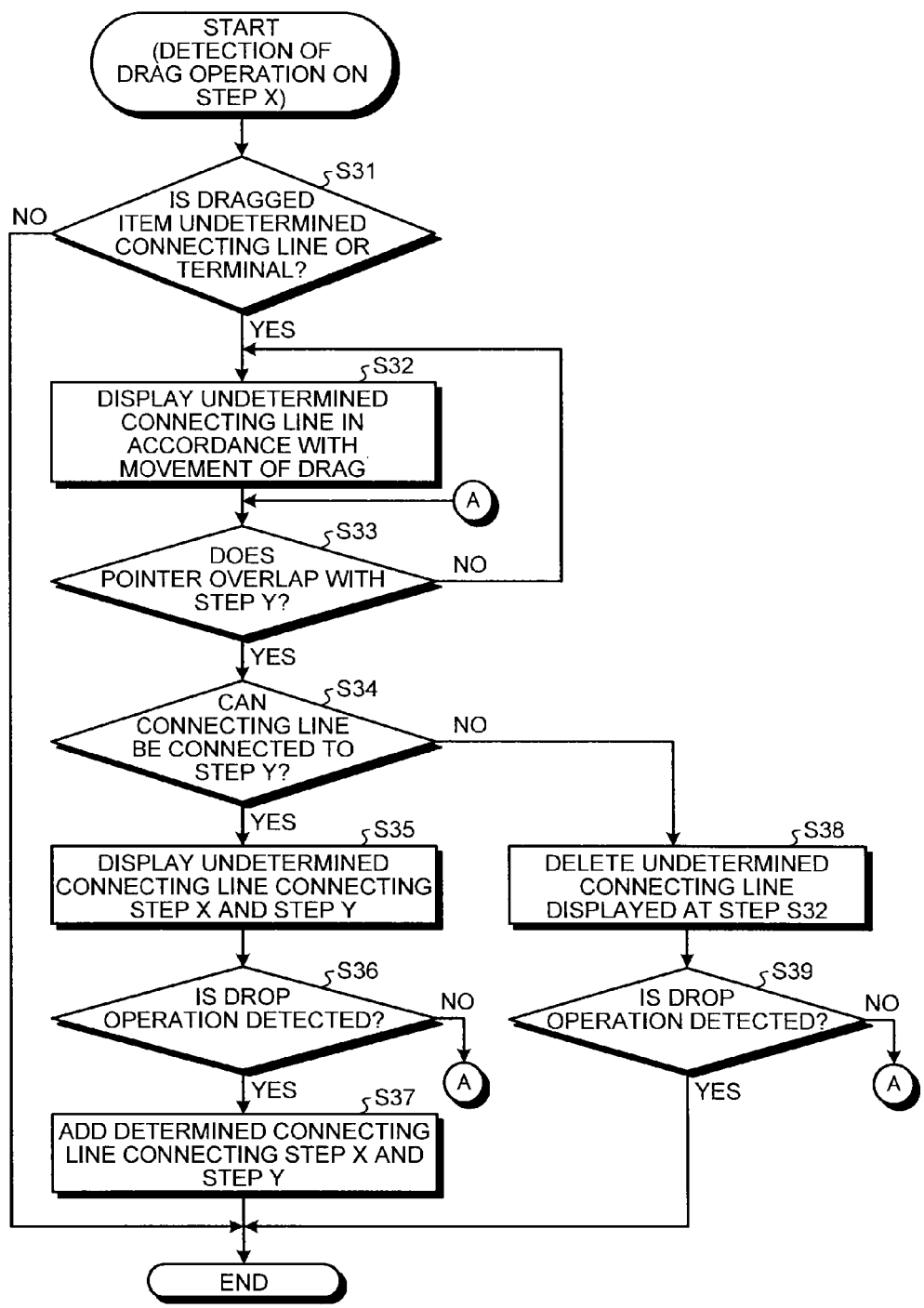
FIG. 10 is a flowchart of processing when drag operation performed on a step arranged in the workflow is detected.

FIG. 10 illustrates a flowchart of the processing executed by the CPU 201 of the server 20 when drag operation performed on the step arranged in the workflow is detected. In the editing screen 100, a user can instruct to make a connection (to add the connecting line) between the steps by dragging the undetermined connecting line or the terminal added to the step arranged in the workflow and thereafter dropping it at a position of another step. When an instruction is made, the dragging is performed from the step on the upstream side to the step on the downstream side. The processing illustrated in FIG. 10 relates to the instruction.

The CPU 201 of the server 20 starts the processing illustrated in the flowchart of FIG. 10 when detecting that the drag operation is performed on a step X arranged in the workflow. At Step S31, the CPU 201 determines whether the dragged item is the undetermined connecting line or the terminal. If the determination result is "Yes", the processing proceeds to Step S32 because the result means that another step is connectable to the step X on the downstream side of the step X. At Step S32, the CPU 201 displays the undetermined connecting line on the editing screen 100. The root point of the undetermined connecting line is fixed and the undetermined connecting line is redisplayed accordingly such that the leading end of the undetermined connecting line arrives at the position of the pointer 127.

At Step S33, the CPU 201 determines whether the pointer 127 overlaps with any of the other steps arranged in the workflow (herein, a step Y). The processing returns to Step S32 and is repeated until the pointer 127 overlaps with any of the steps. When the drop operation is performed during the repetition, the CPU 201 restores the display to that before the start of the processing, and ends the processing (not illustrated).

If the determination result is "Yes" at Step S33, the CPU 201 determines that the instruction is made to make the connection from the step X to the step Y. At Step S34, the CPU 201 determines whether the connecting line can be connected from the step X to the step Y. This determination can be done on the basis of the upstream side connection attribute of the step Y on the downstream side of the step X and the type of the step X with reference to the step type management table illustrated in FIG. 7.

If it is determined that the connecting line can be connected at Step S34, the CPU 201 displays the undetermined connecting line connecting the step X and the step Y at Step S35. The undetermined connecting line is the indication indicating that the step Y is connectable to the step X on the downstream side of the step X. At this stage, the connection is not yet determined.

At Step S36, the CPU 201 determines whether the drop operation is performed. If no drop operation is performed, the processing returns to Step S33 and the processing is repeated. Accordingly, when the pointer 127 overlaps with the step Y, the display at Step S35 is maintained while the processing is repeated from Step S33 to Step S36 whereas when the pointer 127 is off the step Y, the processing returns to Step S22 and is repeated between steps S32 and S33.

At Step S36, if it is determined that the drop operation is performed, the processing proceeds to Step S37 on the basis of the determination that the instruction to determine the connection is made. At Step S37, the CPU 201 adds the determined connecting line connecting the step X and the step Y, and thereafter ends the processing. The processing at Step S37 includes the processing that adds the data of the connecting line to the workflow data and the processing that deletes the indication of the undetermined connecting line displayed at Step S35 and newly displays the determined connecting line on the editing screen 100.

When a certain step is already connected on the upstream side of the step Y, the step X is connected to the step Y through merging with the already connected step. In this case, at Step S37, the CPU 201 adds the merging point on the upstream side of the step Y and adds the determined connecting line connecting the step X and the merging point. When a certain merging point is already arranged on the upstream side of the step Y, at Step S37, the CPU 201 adds the determined connecting line connecting the step X and the merging point. In this case, the undetermined connecting line connecting the step X and the merging point may be displayed at Step S35.

If the connecting line cannot be connected (No at Step S34), at Step S38, the CPU 201 deletes the undetermined connecting line displayed at Step S32. This deletion corresponds to performing the indication indicating that it is impossible to connect the step Y to the step X on the downstream side of the step X and performing a notification to a user that the connection is impossible.

At Step S39, the CPU 201 determines whether the drop operation is performed. If no drop operation is performed, the processing returns to Step S33 and the processing is repeated. Accordingly, when the pointer 127 overlaps with the step Y, the display at Step S38 is maintained while the processing is repeated from Step S33 to Step S39 whereas when the pointer 127 is off the step Y, the processing returns to Step S32 and is repeated between steps S32 and S33.

At Step S39, if it is determined that the drop operation is performed, the CPU 201 adds no connecting line and thereafter ends the processing. If the determination result at Step S31 is "No", the CPU 201 ends the processing without any further processing. Alternatively, the CPU 201 may determine that the drag operation is the operation to move the symbol of the step X and execute processing relating to the movement operation.

In the processing described above, the processing at Step S34 onwards corresponds to the function of a connection processing unit. The server 20 can add the connecting line between the steps by the processing of FIG. 10 in accordance with the user's instruction. In addition, when the connection based on the instruction cannot be made due to the connection attribute and the type of steps illustrated in FIG. 7, the CPU 201 can notify a user that the connection cannot be made in a comprehensive manner, resulting in the user being able to perform comfortable editing operation.

When the step having a value of "connection impossible" for the downstream side connection attribute is dragged, the determination result at Step S31 is consistently "No" because no undetermined connecting line and no terminal are added to the step. As a result, no connecting line is added and no undetermined connecting line is displayed during the drag operation. When a user attempts by mistake to instruct connection of another step to the step having no connectibility on the downstream side thereof, the user is promptly aware of the mistake and can stop the operation, resulting in useless operation being prevented. This also makes it possible to increase comfort and productivity in editing operation.

Figure 11:
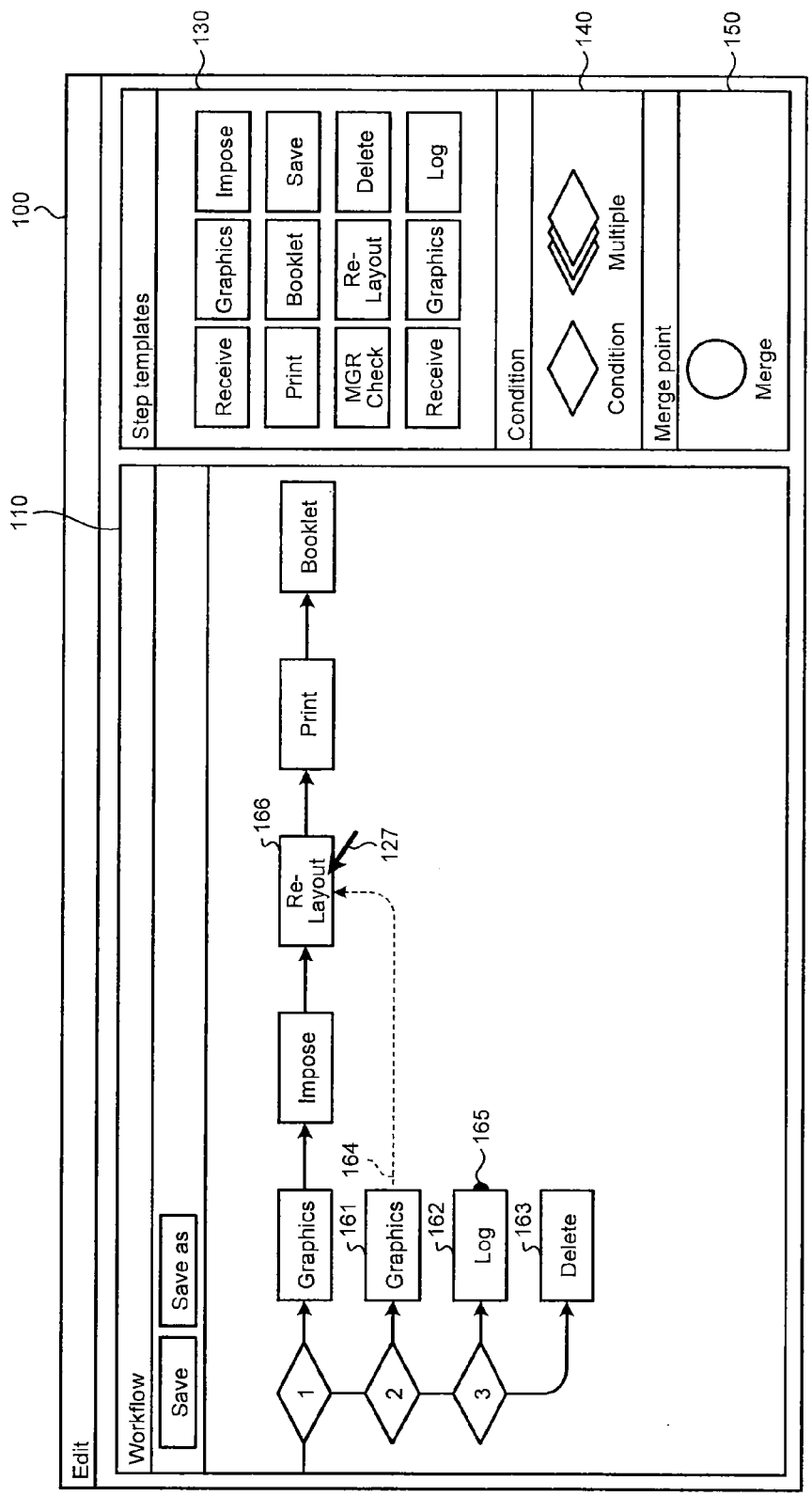
FIG. 11 is a schematic diagram illustrating an example of an addition of a connecting line by the processing of FIG. 10.

FIGS. 11 to 14 illustrate an example of the addition of the connecting line by the processing of FIG. 10. FIG. 11 illustrates the state in which the respective steps 161 to 163 are connected to the corresponding branching points after the state illustrated in FIG. 9, and the undetermined connecting line 164 added to the step 161 is dragged and the pointer 127 is overlapped with a step 166. In this state, the undetermined connecting line connecting the step 161 and the step 166 is displayed by the processing at Step S35 of FIG. 10.

Figure 12:
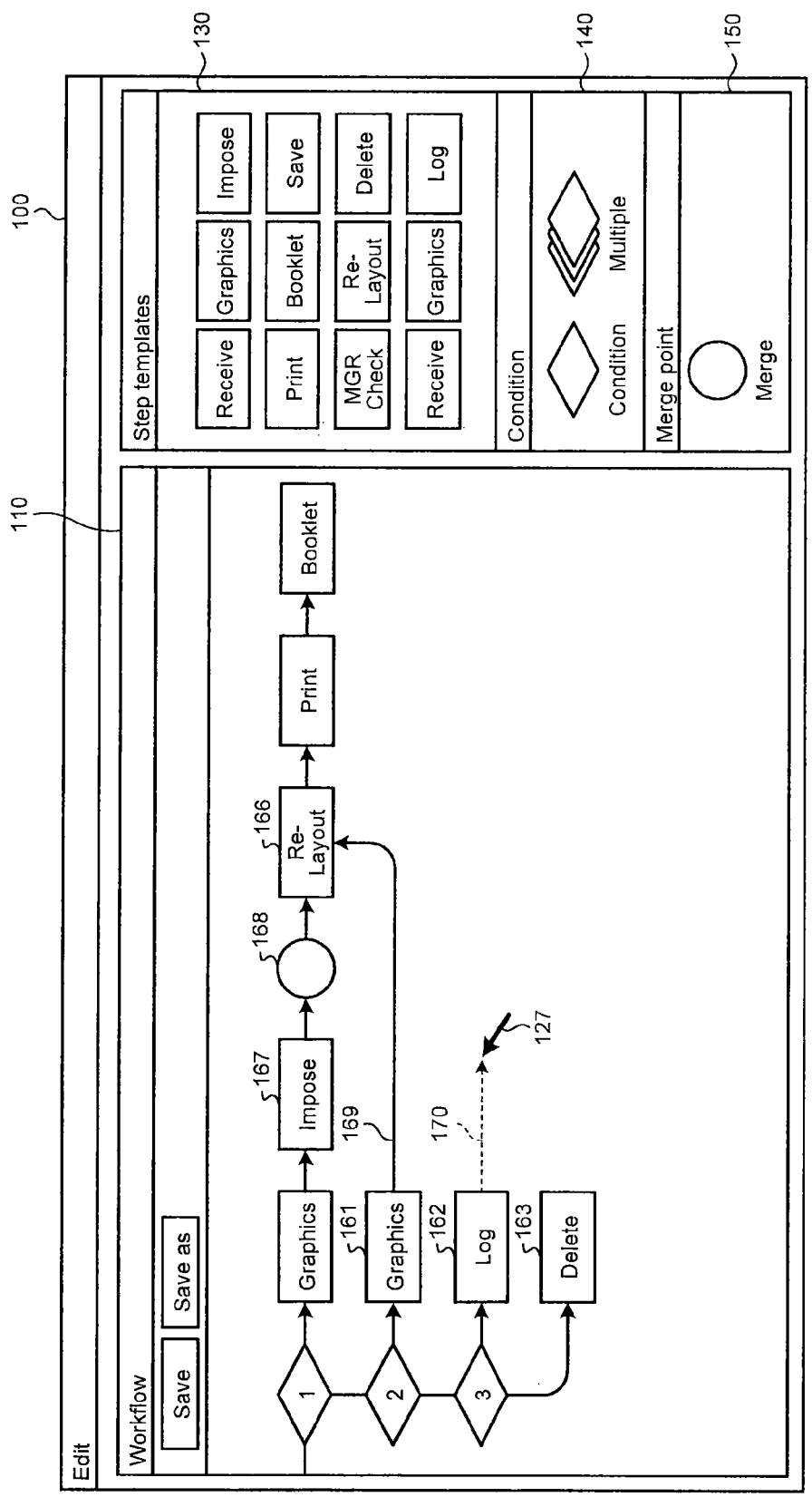
FIG. 12 is a schematic diagram illustrating the processing after that of FIG. 11.

FIG. 12 illustrates the state in which, after the state illustrated in FIG. 11, the drop operation is performed and the terminal 165 of the step 162 is dragged. The server 20, which originally would add the determined connecting line connecting the step 161 and the step 166 by the processing at Step S37 of FIG. 10, adds a merging point 168 because a step 167 is already connected to the step 166 on the upstream side of the step 166. The server 20 adds a determined connecting line 169 connecting the step 161 and the merging point 168. In accordance with the drag operation performed on the terminal 165, an undetermined connecting line 170 extending from the step 162 is displayed by the processing at Step S32 of FIG. 10. The indication of the terminal 165 is deleted, whereas the indication of terminal 165 may remain unchanged.

Figure 13:
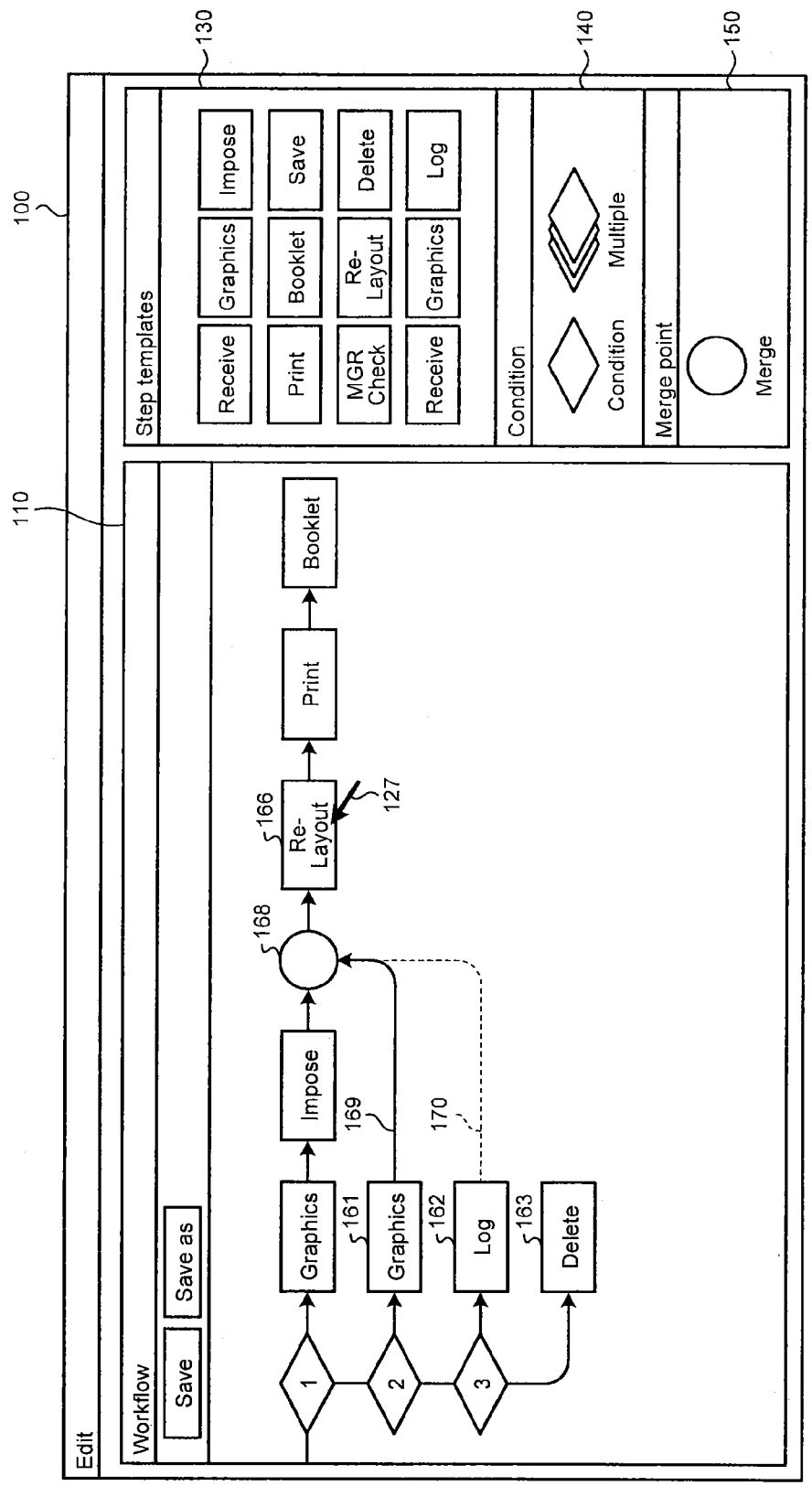
FIG. 13 is a schematic diagram illustrating the processing after that of FIG. 12.
Figure 14:
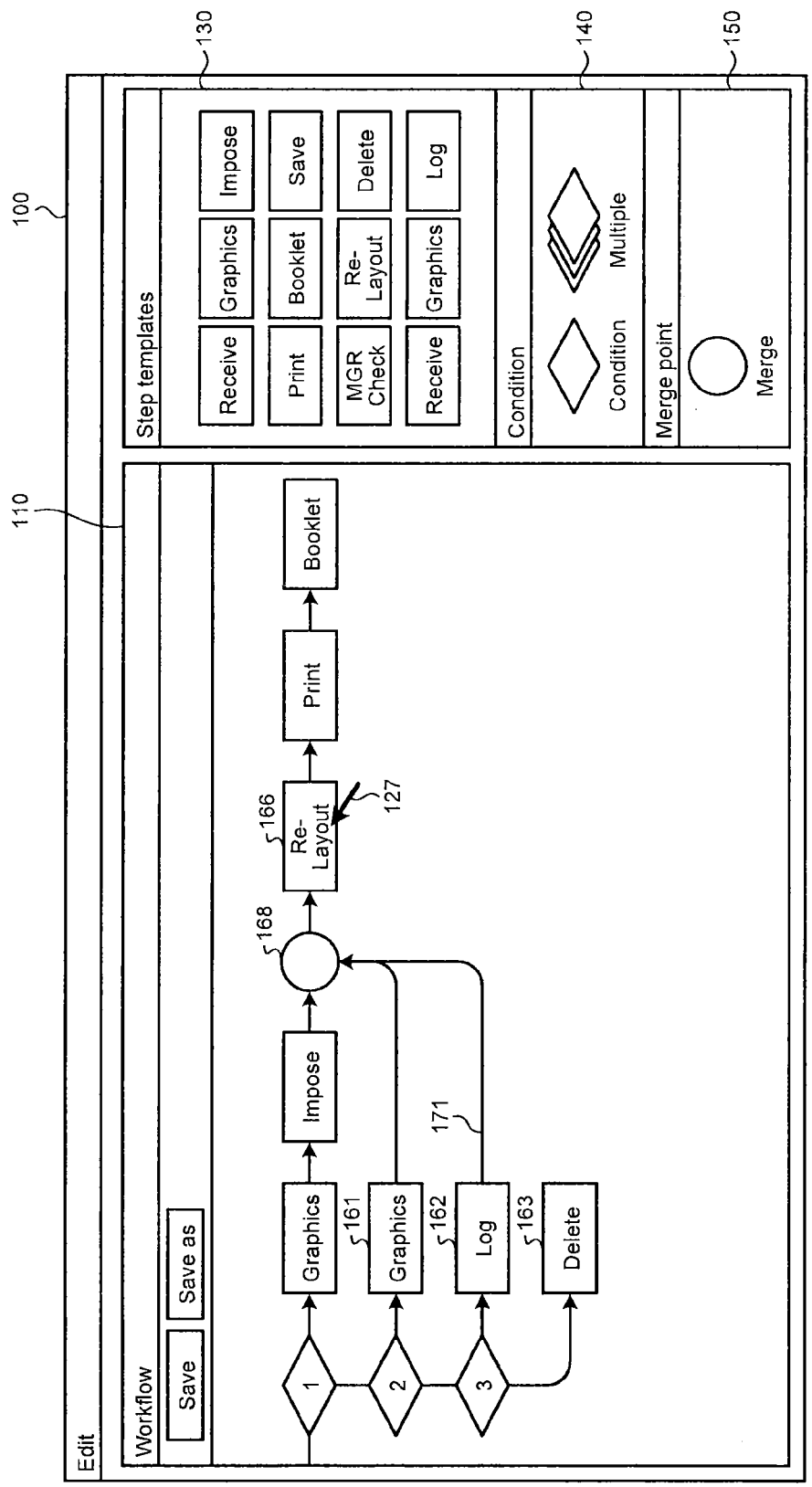
FIG. 14 is a schematic diagram illustrating the processing after that of FIG. 13.

FIG. 13 illustrates the state in which, after the state illustrated in FIG. 12, the pointer 127 is overlapped with the step 166. In this state, the server 20 originally would display the undetermined connecting line 170 connecting the step 162 and the step 166 by the processing at Step S35 of FIG. 10. However, the merging point 168 is arranged on the upstream side of the step 166. The server 20 displays the undetermined connecting line 170 connected to the merging point 168 as the final connection destination instead of the step 166. FIG. 14 illustrates the state in which the drop operation is performed after the state illustrated in FIG. 13. In accordance with the operation, the server 20 changes the undetermined connecting line 170 displayed as illustrated in FIG. 13 to a determined connecting line 171.

Figure 15:
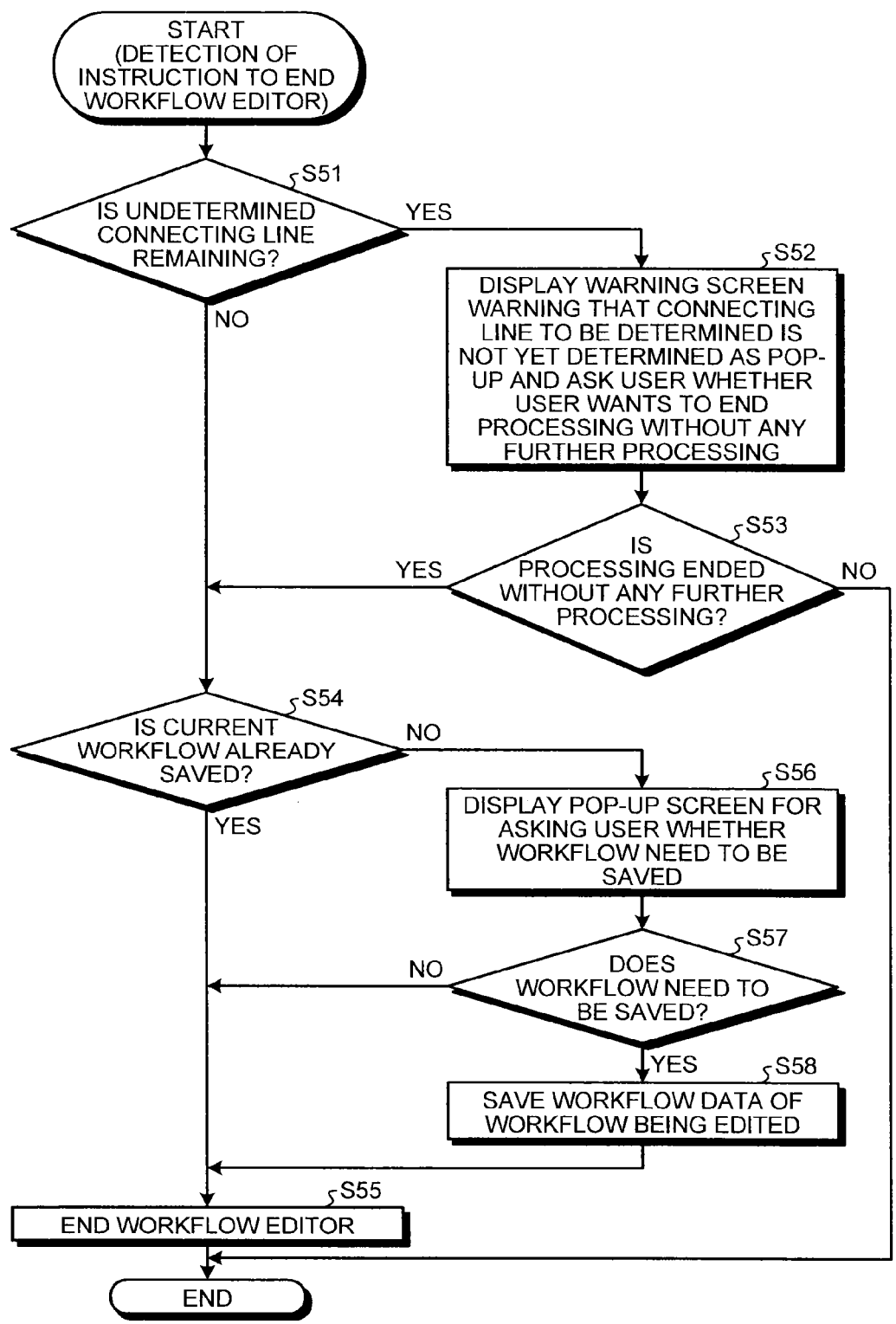
FIG. 15 is a flowchart of processing when an instruction to end a workflow editor is detected.

FIG. 15 illustrates a flowchart of the processing executed by the CPU 201 of the server 20 when an instruction is detected to end the workflow editor. The CPU 201 of the server 20 starts the processing illustrated in the flowchart of FIG. 15 when detecting that the instruction to end the workflow editor, i.e., the instruction to close the editing screen 100, is made on the editing screen 100. In the processing, at Step S51, the CPU 201 determines whether undetermined connecting lines remain in the workflow being edited. If undetermined connecting lines remain, at Step S52, the CPU 201 displays a warning screen warning that the connecting line to be determined is not yet determined as a pop-up so as to ask a user whether the user wants to end the processing without any further processing.

At Step S53, the CPU 201 determines whether the instruction to end the processing is made. If the processing is not ended as the result of the determination, the CPU 201 ends the processing of FIG. 15 without any further processing. In this case, the display is restored to the editing screen 100 because the workflow editor does not end.

If the processing is ended as the result of the determination at Step S53, the processing proceeds to Step S54 onwards. At Step S51, if it is determined that no undetermined connecting lines remain, the processing also proceeds to Step S54 onwards without any further processing because no warning is required to be made. At Step S54, the CPU 201 determines whether the current workflow (being edited) is already saved. If it is determined that the workflow is already saved, the CPU 201 ends the workflow editor at Step S55, and thereafter ends the processing of FIG. 15.

If it is determined that the workflow is not yet saved, the CPU 201 displays a pop-up screen asking a user whether the workflow needs to be saved at Step S56. At Step S57, the CPU 201 determines the contents of the instructions made on the screen. If the instruction to save the workflow is made, the CPU 201 saves the workflow data of the workflow being edited in a designated storage at Step S58. Thereafter, the processing proceeds to Step S55, at which the CPU 201 ends the workflow editor. If the workflow is not saved as the result of the determination at Step S57, the processing proceeds to Step S55 without performing saving, at which the CPU 201 ends the workflow editor.

As described in the processing, when a user intends to end the workflow although the connecting line to be determined is not yet determined, the server 20 can warn the user of the presence of an undetermined connecting line. Such a workflow is inappropriate in which the workflow editor is ended although the connecting line to be determined is not yet determined because the workflow returns an error when being executed. If such a workflow is unknowingly saved, a problem arises when the workflow is executed after being read out. It is important to provide a warning message at the end stage as described above. With this concept, when the editing result is intended to be saved in editing the workflow, it is preferable to give a similar warning.

Figure 16:
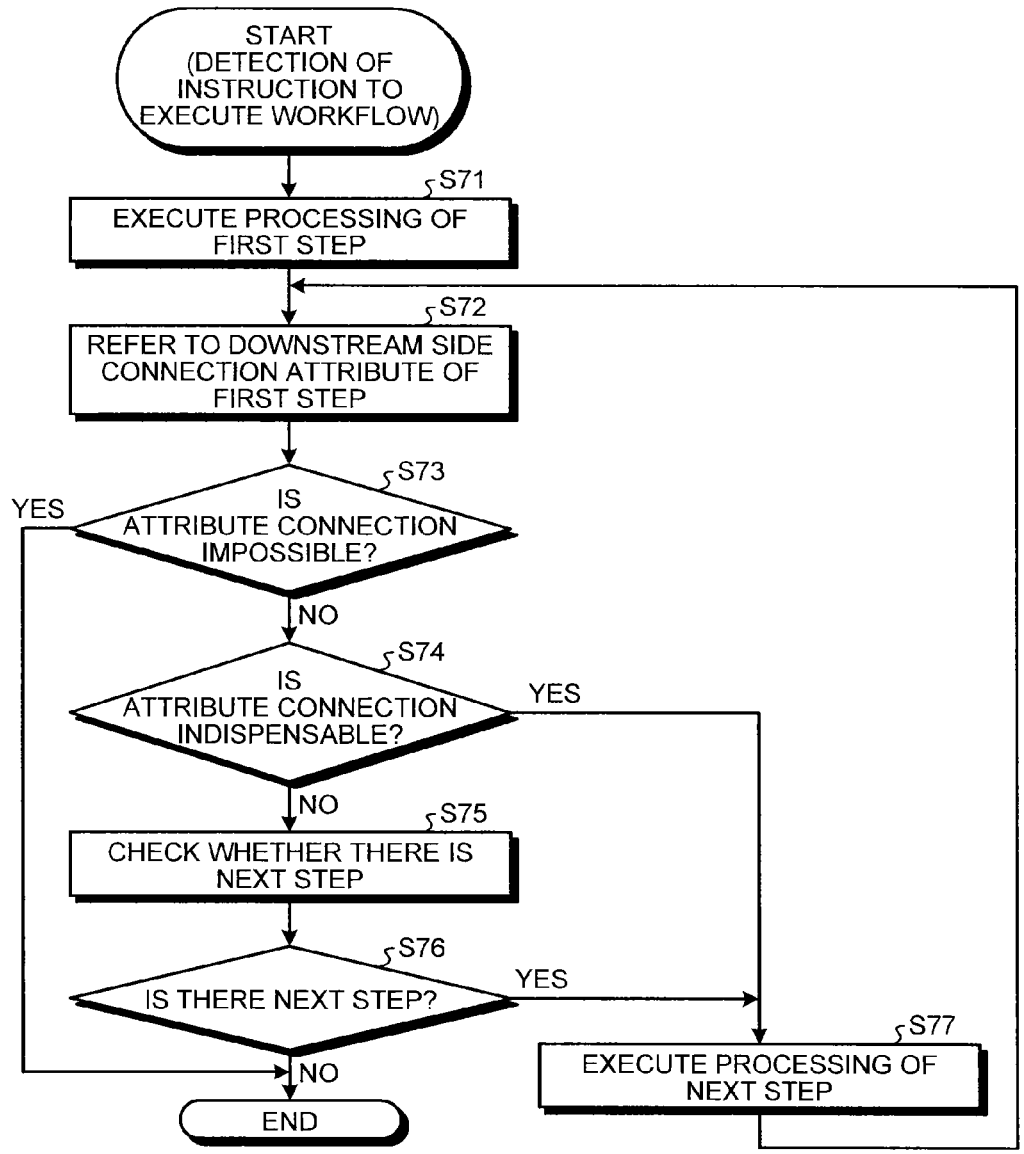
FIG. 16 is a flowchart of processing when an instruction to execute the workflow is detected.

FIG. 16 illustrates a flowchart of the processing executed by the CPU 201 of the server 20 when an instruction is detected to execute the workflow. When the workflow to be executed is designated and the instruction to execute the workflow is made by an external apparatus such as the client apparatus 10 or by the direct operation of the server 20, the CPU 201 of the server 20 refers to the saved workflow data of the designated workflow and starts the processing illustrated in the flowchart of FIG. 16.

At Step S71, the CPU 201 executes the processing of the first step in the workflow. At Step S72, the CPU 201 refers to the step type management table illustrated in FIG. 7 and acquires the value of the downstream side connection attribute of the first step. At Step S73, the CPU 201 determines whether the value is that of "connection impossible". If it is determined that the value is that of "connection impossible", the CPU 201 ends the processing because the next step is not present.

At Step S73, if it is determined that the value is not that of "connection impossible", the CPU 201 determines whether the value is that of "connection indispensable" at Step S74. If it is determined that the value is that of "connection indispensable", which means that the next step is required to be connected to the first step, the CPU 201 executes the processing of the next step at Step S77. Thereafter, the processing returns to Step S72. At Step S74, if it is determined that the value is not that of "connection indispensable", this means that the value of the downstream side connection attribute is that of "connection possible". In this case, the next step or no step can be connected. Thus, at Step S75, the CPU 201 checks whether there is a next step, and determines whether there is a next step at Step S76.

If it is determined that the next step is connected, the CPU 201 executes the processing of the next step at Step S77. If it is determined that no step is connected, the CPU 201 ends the processing without any further processing. The processing described above corresponds to the function of an execution control unit. The processing at Step S72 corresponds to the function of an attribute identifying unit. The server 20 can execute the processing following the workflow edited on the editing screen 100 by executing the processing described above. As illustrated in the flowchart, when the processing reaches the step having a value of "connection impossible" for the downstream side connection attribute, the processing ends automatically. No end step indicating the end of the processing is required to be arranged in the workflow. This makes it possible to reduce the operation required to edit the workflow.

Second Embodiment

A second embodiment is described below. The second embodiment differs from the first embodiment only in that areas are taken into consideration when the workflow is edited. The following description is made primarily on the difference and other descriptions are simplified or omitted. In the second embodiment, elements corresponding to those in the first embodiment are labeled with the same reference numerals as the first embodiment.

FIG. 17 illustrates a functional structure of the workflow editing unit 212 of the server 20 in the second embodiment. FIG. 17 corresponds to FIG. 4. In the second embodiment, the workflow editing unit 212 includes an area management unit 226 and an area definition unit 227 in addition to the units illustrated in FIG. 4. The area management unit 226 has a function to manage which step is to be arranged in which area in the workflow.

The area definition unit 227 has a function to define the areas in the workflow using an area information table illustrated in FIG. 18. As illustrated in FIG. 18, an area name and area information indicating the feature of the area are stored so as to correspond to an ID of the area arranged in the workflow in the area information table. The area information table may be stored by the server 20 or may be stored in an external apparatus accessible from the server 20, such as another server provided by the vendor.

Figure 19:
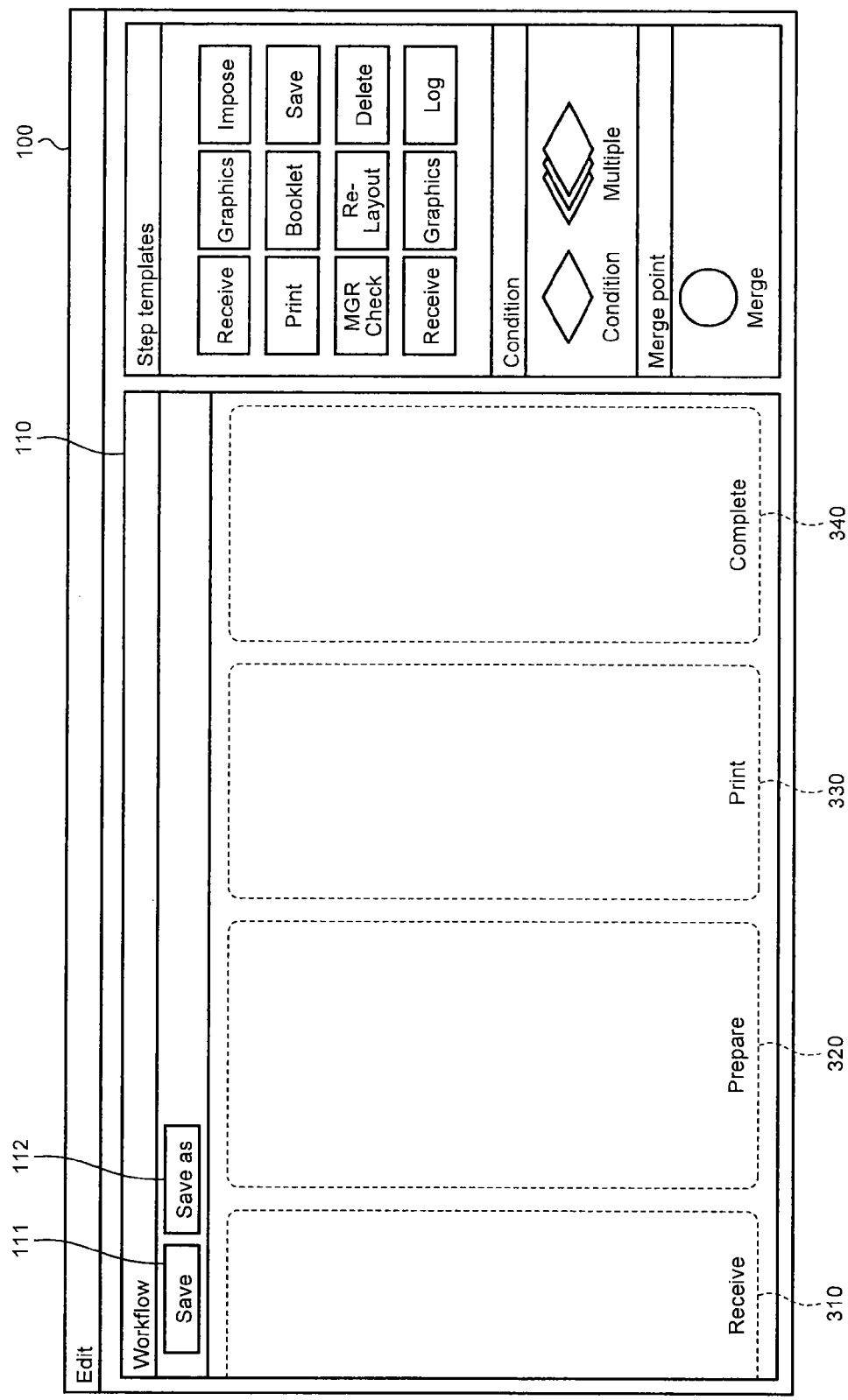
FIG. 19 is a schematic diagram illustrating an example of the editing screen in the second embodiment.

FIG. 19 illustrates an example of the editing screen 100 in the second embodiment. In the second embodiment, as illustrated in FIG. 19, the workflow window 110 in the editing screen 100 is zoned into four areas of a receiving area 310, a preparation area 320, a print area 330, and a completion area 340. When the step is arranged in the workflow, the step can be added to the workflow as the step of a desired area by dropping the step in the desired area. That is, the instruction can be made to add the step with the designation of the area to which the step is added.

FIG. 20 illustrates an example of the step type management table in the second embodiment. The step type management table illustrated in FIG. 20 has the same purpose as the step type management table illustrated in FIG. 7. The step type management table illustrated in FIG. 20, however, differs from that illustrated in FIG. 7 in that connectivity in an identical area is provided as an additional item of the downstream side connection attribute. The connectivity in an identical area is provided as the additional item only to the type of step having a value of "connection indispensable" for the downstream side connection attribute. The connectivity in an identical area has two values of "connectable in an identical area" indicating that another step arranged in the same area as a certain step is connectable to the certain step on the downstream side of the certain step and of "unconnectable in an identical area (connectable only in another area)" indicating that only another step arranged in another area is allowed to be connected on the downstream side of a certain step.

Another difference is that the upstream side connection attribute is set for each area where the step is arranged. The area ID indicates information relating to which area the step is arranged. For each area where the step is arranged, it can be designated which type of step is connectable and which type of step is unconnectable on the upstream side.

FIG. 21 illustrates a flowchart of the processing executed by the CPU 201 of the server 20 when an instruction is detected to arrange a new step in the workflow. FIG. 21 corresponds to FIG. 8. In the second embodiment, the CPU 201 of the server 20 starts the processing illustrated in the flowchart of FIG. 21 when detecting the instruction to arrange a new step in the workflow in the editing screen 100 on the basis of the command received from the client apparatus 10, for example. At Step S111, the CPU 201 adds the step to the workflow being edited in accordance with the instruction. In this processing, the data of the step instructed to be arranged is added to the workflow data.

At Step S112, the CPU 201 displays the graphic symbol, which is the display part of the step added at Step S111 in the area where the step is designated to be arranged on the editing screen 100. At Step S113, the CPU 201 refers to the step type management table illustrated in FIG. 20 and acquires the value of the downstream side connection attribute of the step arranged at Step S111.

At Step S114, the CPU 201 determines whether the value of the downstream side connection attribute is that of "connection impossible". If the determination result is "No", the CPU 201 determines whether the value of the downstream side connection attribute is that of "connection indispensable" at Step S115. If the determination result is "No" at Step S115, this means that the value of the downstream side connection attribute is that of "connection possible". The processing proceeds to Step S116, at which the CPU 201 adds an indication of the terminal to the graphic symbol displayed at Step S112 as the auxiliary indication of the step having a value of "connection possible" for the downstream side connection attribute.

If the determination result is "Yes" at Step S115, which means that the value of the downstream side connection attribute is that of "connection indispensable", the processing proceeds to Step S117, at which the CPU 201 determines whether the step arranged at Step S111 has a value of "connectable in an identical area" for the downstream side connection attribute. If the determination result is "Yes", at Step S118, the CPU 201 adds the indication of the undetermined connecting line to the graphic symbol of the step displayed at Step S112 as the auxiliary indication of the step having values of "connection indispensable" and "connectable in an identical area" for the downstream side connection attribute. The leading end of the undetermined connecting line remains in the same area in which the symbol of the step is displayed.

If the determination result is "No" at Step S117, the CPU 201 determines that the added step is "connectable only in another area". The processing proceeds to Step S119, at which the CPU 201 adds the indication of the undetermined connecting line to the graphic symbol of the step displayed at Step S112 as the auxiliary indication of the step having values of "connection indispensable" and "connectable only in another area" for the downstream side connection attribute. The leading end of the undetermined connecting line is extended from the symbol of the added step to the adjacent area on the downstream side.

If the determination result is "Yes" at Step S114, the processing proceeds to Step S120. This means that the value of the downstream side connection attribute is that of "connection impossible". The CPU 201 adds no auxiliary indication to the graphic symbol displayed at Step S112. After the completion of each processing at steps S116, S117, and S118, the CPU 201 ends the processing. In the processing described above, the processing at Step S113 onwards corresponds to the function of the auxiliary indication control unit.

Figure 22:
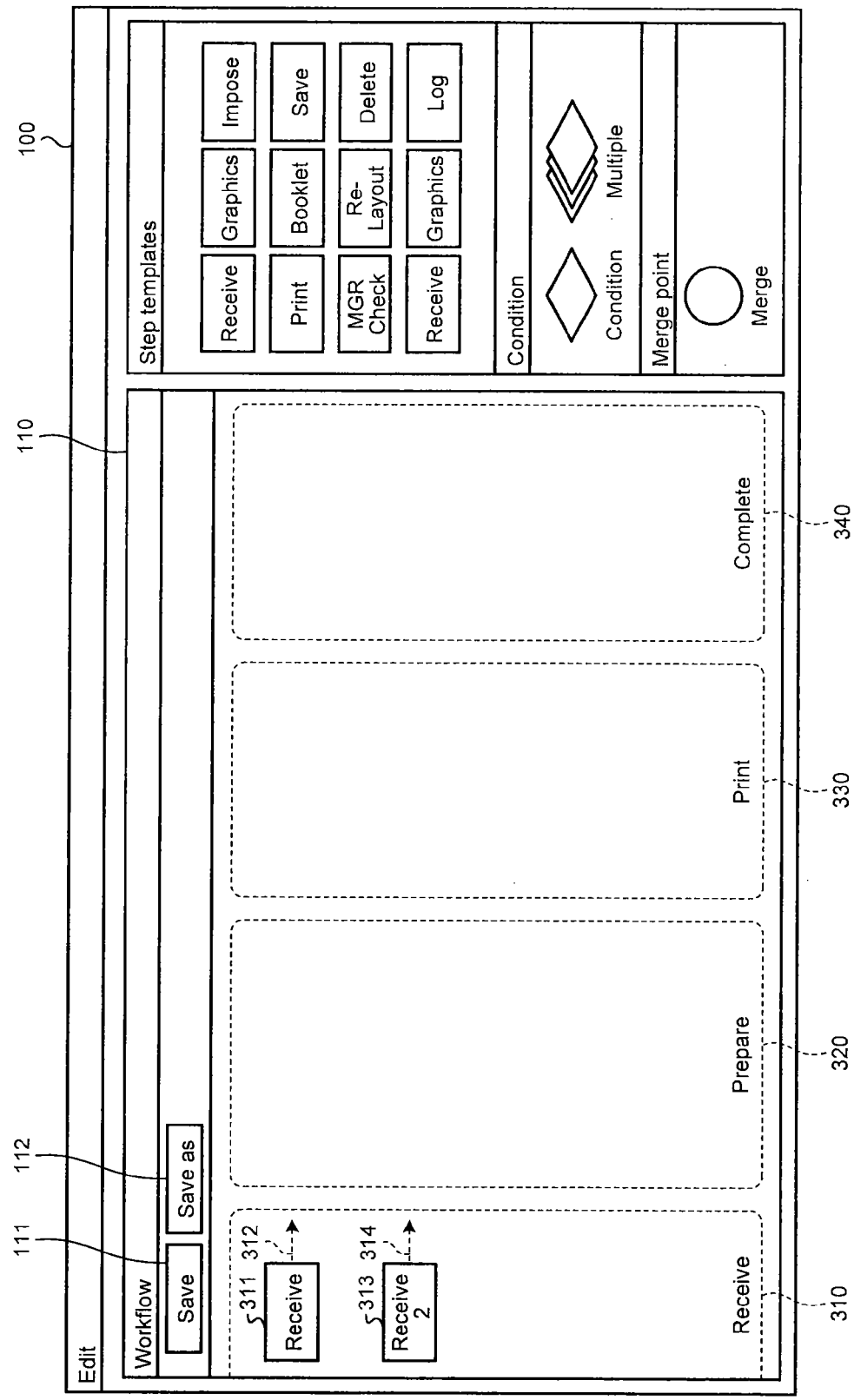
FIG. 22 is a schematic diagram illustrating examples of the auxiliary indication in the processing of steps S118 and S119 of FIG. 21.

FIG. 22 illustrates examples of the auxiliary indication in the processing at steps S118 and S119. The auxiliary indications displayed by the processing at steps S116 and S120 are the same as those illustrated in FIG. 9. FIG. 22 illustrates the state in which steps 311 and 313 are sequentially newly arranged in the workflow. An undetermined connecting line 312 is added to the step 311 as the auxiliary indication because the step 311 has values of "connection indispensable" and "connectable in an identical area" for the downstream side connection attribute. The leading end of the undetermined connecting line 312 remains in the same area as the step 311. This undetermined connecting line 312 is the indication indicating that any step is required to be connected on the downstream side of the step and any step to be connected is connectable in the same area as the step.

An undetermined connecting line 314 the leading end of which is extended to the adjacent are is added to the step 313 as the auxiliary indication because the step 314 has values of "connection indispensable" and "connectable only in another area" for the downstream side connection attribute. This undetermined connecting line 314 is the indication indicating that any step is required to be connected on the downstream side of the step and any step to be connected is not allowed to be connected in the same area as the step.

In this way, when a new step is added to the workflow by the processing of FIG. 21, the server 20 can cause the editing screen 100 to display the graphic symbol of the added step with the auxiliary indication corresponding to the values of the downstream side connection attribute of the added step.

The auxiliary indication can provide whether the next step is connectable on the downstream side and also whether the next step is connectable in the same area as the step to a user in a comprehensive manner.

With reference to the auxiliary indication, a user can readily create an appropriate workflow in the same manner as the first embodiment. As a result, the productivity in editing the workflow can be increased. Although the workflow is zoned into areas, the complexity of editing due to the zoned areas can be reduced.

Third Embodiment

A third embodiment is described below. The third embodiment differs from the second embodiment only in that connectable steps are highlighted when the undetermined connecting line or the terminal is dragged. The following description is made primarily on the difference and other descriptions are simplified or omitted. In the third embodiment, elements corresponding to those in the first and the second embodiments are labeled with the same reference numerals as the first and the second embodiments.

Figure 23:
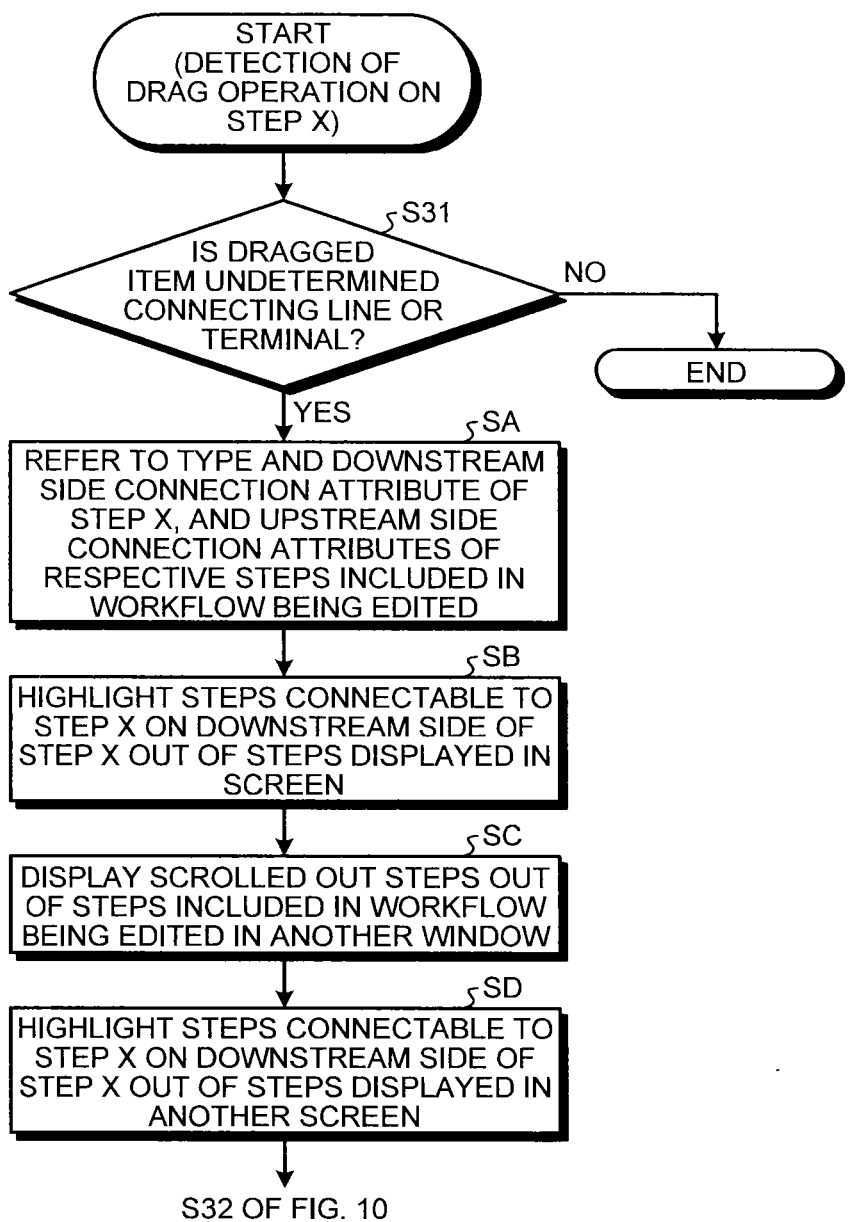
FIG. 23 is a flowchart illustrating a part of processing when the drag operation performed on a step arranged in the workflow is detected in a third embodiment of the present invention.

In the third embodiment, the beginning part of the processing of FIG. 10 is replaced with the flowchart illustrated in FIG. 23. In the third embodiment, the CPU 201 of the server 20 starts the processing illustrated in the flowchart of FIG. 23 when detecting that the drag operation is performed on the step X arranged in the workflow. In the processing of FIG. 23, Step S31 is the same as that in the processing of FIG. 10, at which the CPU 201 determines whether the dragged item is the undetermined connecting line or the terminal. If the determination result is "No", the CPU 201 ends the processing without any further processing.

At Step S31, if the determination result is "Yes", the CPU 201 executes the processing to highlight the steps connectable to the step X on the downstream side of the step X. At Step SA, the CPU 201 acquires the type and the downstream side connection attribute (whether connectable only in another area) of the step X and the information of the upstream side connection attribute of each step included in the workflow being edited. The information can be acquired from the step type management table illustrated in FIG. 20.

At Step SB, the CPU 201 highlights the steps connectable to the step X on the downstream side of the step X out of the steps displayed on the screen (the workflow window 110). Whether the step is connectable can be determined on the basis of the upstream side connection attribute of the step, the area where the step is arranged, and the type of the step X. When the step X has a value of "connectable only in another area" for the downstream side connection attribute, the step arranged in the same area as the step X is unconnectable.

At Step SC, the CPU 201 displays in another window the steps that are not displayed by being scrolled out from the workflow window 110 out of the steps included in the workflow being edited. The steps that do not need to be taken into consideration of the connecting destinations, such as the steps arranged in the area on the upstream side of the step X, may be omitted to be displayed. At Step SD, the CPU 201 highlights the steps connectable to the step X on the downstream side of the step X in the other window. Whether the step is connectable is determined in the same manner as Step SB. Thereafter, the processing proceeds to Step S32 onwards of FIG. 10. The CPU 201 functions as a highlighting processing unit in the processing from Step SA to Step SD.

Figure 24:
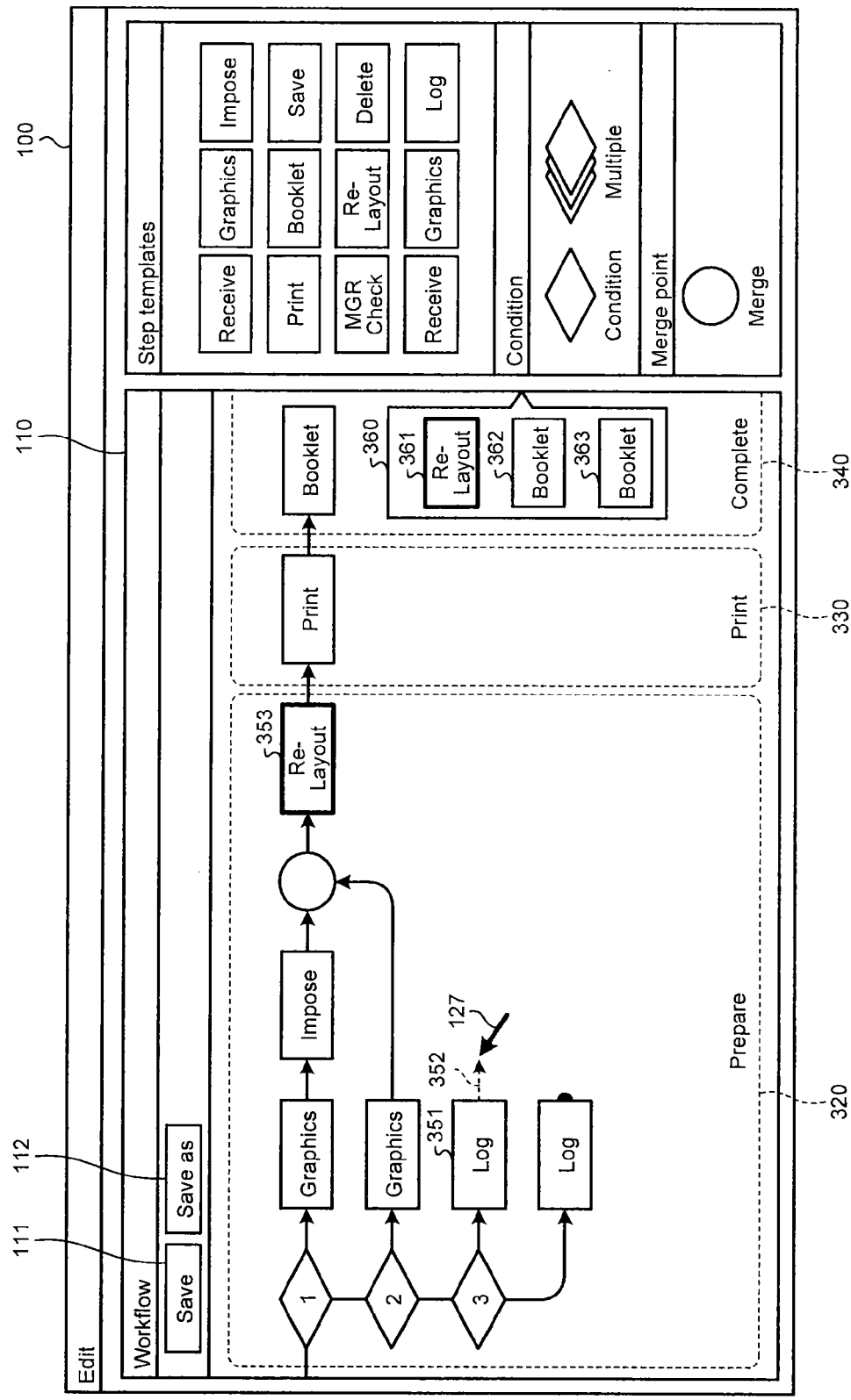
FIG. 24 is a schematic diagram illustrating an example of a display in the processing from steps SB to SD of FIG. 23.

FIG. 24 illustrates an example of the display in the processing from Step SB to Step SD. FIG. 24 illustrates the state in which the terminal of a step 351 is dragged and an undetermined connecting line 352 is displayed by the processing at Step S32. The receiving area on the most upstream side and a part of the completion area on the most downstream side are scrolled out from the workflow window 110.

In response to the dragging of the terminal of the step 351, a step 353 is highlighted out of the steps displayed on the screen as the connectable step by the processing at Step SB of FIG. 23. Steps 361, 362, and 363 scrolled out from the workflow window 110 are displayed in a window 360 by the processing at Step SC. The step 361 is highlighted as the connectable step by the processing at Step SD. In FIG. 24, the highlighting is displayed with a thick frame. Any highlighting is applicable, such as color, depth of color, or blinking.

As described above, the server 20 can notify a user of the step relating to an instruction and the connectable steps with highlighting by the processing of FIG. 23 when the user intends to make the instruction to connect the step. Even if the connection attribute of each step is complicated, a user can be prevented from making an instruction to connect the step to the unconnectable step by referring to the auxiliary indication. As a result, useless operation can be reduced and the productivity in editing the workflow can be increased.

In the embodiments, the specific structures of units, the contents of processing, the procedures of operation, the format of used data, and the display contents of screens are not limited to those described in the embodiments. Though the client apparatus 10 and the server 20 are independent apparatuses in the embodiments, they may be an integrated apparatus, for example. The functions of the server 20 may be separated and included in devices of the client apparatus 10. A part of the functions of the server 20 may be separated and included in the client apparatus 10 and the server 20. The editing of the workflow and the execution of the processing on the basis of the workflow may be done by different apparatuses. A plurality of client apparatuses 10 are applicable and also a plurality of MFPs 30 are applicable.

Only one of the upstream side connection attribute and the downstream side connection attribute in the embodiments may be used. When the upstream side connection attribute is not used, all of the types of steps are determined to be connectable to a certain step on the upstream side of the certain step. When the downstream side connection attribute is not used, all of the types of steps are determined to have values of "connection possible" for the attributes.

The values of the connecting attributes of the respective steps are not limited to those specifically described in the embodiments. The contents of the auxiliary indications are also not limited to those specifically described in the embodiments. The contents of the processing indicated by the workflow are not limited to the image scanning, the image forming, and the image processing. Processing not related to images can be indicated by the workflow as long as the processing can be executed by the apparatus that executes the processing in accordance with the workflow or the processing can be executed by the other apparatuses by instructing the execution of the processing.

The program of the invention causes a computer to achieve the functions of editing the workflow as described in the embodiments. The effects described above can be achieved by causing the computer to execute the program. The program may be preliminarily stored in a storage unit, such as a ROM, included in the computer. Alternatively, the program may be recorded in a compact disc read only memory (CD-ROM) serving as a storage medium or a non-volatile storage medium (memory) such as a flexible disk, a static RAM (SRAM), an electrically erasable and programmable ROM (EEPROM), and a memory card, and provided. The program recorded in the memory is installed into the computer and the computer causes the CPU to execute the program. As a result, the processing described above can be performed.

Furthermore, the program can be downloaded to the computer from an external apparatus including a storage medium storing therein the program or an external apparatus including a storage unit storing therein the program, both of which are connected to a network, and the computer causes the CPU to execute the program. The embodiments, the operation examples, and the modifications described above can be performed in any combination without inconsistency among them.

According to the embodiments, it is possible to provide an advantage of allowing a user to readily create a workflow.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Note 1. An information processing apparatus comprising:
  a workflow execution unit configured to execute a workflow including a plurality of steps each indicating a process;
  a workflow generation unit configured to produce the workflow by combining the steps;
  a workflow display unit configured to display the workflow;
  a step management unit configured to store therein each of the steps and an attribute of the each of the steps in association with each other; and
  an auxiliary indication control unit configured to display an auxiliary indication corresponding to the attribute of a specified step in the workflow based on the attribute.

Note 2. The information processing apparatus according to Note 1, wherein
  the attribute indicates one of at least a connection indispensable, a connection possible, and a connection impossible, and
  the auxiliary indication control unit displays an undetermined connecting line for a step having the attribute indicative of the connection indispensable as the auxiliary indication, a terminal for a step having the attribute indicative of the connection possible as the auxiliary indication, and no auxiliary indication for a step having the attribute indicative of the connection impossible.

Note 3. The information processing apparatus according to Note 1, wherein
  the workflow is zoned into a plurality of areas,
  each of the steps has an attribute indicating one of at least connectable in an identical area and connectable only in another area, and
  the auxiliary indication control unit displays an undetermined connecting line crossing the areas for a step having the attribute indicative of the connectable only in another area as the auxiliary indication, and an undetermined connecting line in the identical area of a step having the attribute indicative of the connectable in an identical area for the step as the auxiliary indication.

Note 4. The information processing apparatus according to Note 1, wherein
  the step management unit manages attributes each indicating a type of step connectable to an upstream step, and
  the information processing apparatus further comprises
    a connection processing unit configured to, in response to
      an instruction to connect a step having an attribute indicative of being connectable to a downstream step to another step, display a connecting line connecting the steps related to the instruction when the connection indicated in the instruction is determined to be feasible based on a type of upstream step related to the instruction and the attribute of a downstream step related to the instruction, and notify a user that the connection between the steps related to the instruction is infeasible when the connection is determined to be infeasible based on the type of upstream step related to the instruction and the attribute of the downstream step related to the instruction.

Note 5. The information processing apparatus according to Note 1, wherein the step management unit manages attributes each indicating a type of step connectable to an upstream step, and the information processing apparatus further comprises a highlighting processing unit configured to, in response to an instruction to select a step arranged in the workflow and having an attribute indicative of being connectable to a downstream step, search for a downstream step that is already arranged in the workflow and connectable to the step based on a type of the step related to the instruction, and highlight the downstream step as a result of search.

Note 6. The information processing apparatus according to Note 1, further comprising:

a process management unit configured to store therein each of the processes and an attribute of the each of the processes in association with each other;

an attribute identifying unit configured to identify the attribute of the process to be executed by the workflow execution unit from the process management unit; and an execution control unit configured to control the execution of the workflow based on whether another process follows the process when the attribute identifying unit identifies a certain attribute.

Note 7. A system comprising:

a workflow execution unit configured to execute a workflow including a plurality of steps each indicating a process;

a workflow generation unit configured to produce the workflow by combining the steps;

a workflow display unit configured to display the workflow;

a step management unit configured to store therein each of the steps and an attribute of the each of the steps in association with each other; and an auxiliary indication control unit configured to display an auxiliary indication corresponding to the attribute of a specified step in the workflow based on the attribute.

Note 8. The system according to Note 7, wherein the attribute indicates one of at least a connection indispensable, a connection possible, and a connection impossible, and the auxiliary indication control unit displays an undetermined connecting line for a step having the attribute indicative of the connection indispensable as the auxiliary indication, a terminal for a step having the attribute indicative of the connection possible as the auxiliary indication, and no auxiliary indication for a step having the attribute indicative of the connection impossible.

Note 9. The system according to Note 7, wherein the workflow is zoned into a plurality of areas, each of the steps has an attribute indicating one of at least connectable in an identical area and connectable only in another area, and the auxiliary indication control unit displays an undetermined connecting line crossing the areas for a step having the attribute indicative of the connectable only in another area as the auxiliary indication, and an undetermined connecting line in the identical area of a step having the attribute indicative of the connectable in an identical area for the step as the auxiliary indication.

Note 10. The system according to Note 7, wherein the step management unit manages attributes each indicating a type of step connectable to an upstream step, and the information processing apparatus further comprises a connection processing unit configured to, in response to an instruction to connect a step having an attribute indicative of being connectable to a downstream step to another step, display a connecting line connecting the steps related to the instruction when the connection indicated in the instruction is determined to be feasible based on a type of upstream step related to the instruction and the attribute of a downstream step related to the instruction, and notify a user that the connection between the steps related to the instruction is infeasible when the connection is determined to be infeasible based on the type of upstream step related to the instruction and the attribute of the downstream step related to the instruction.

Note 11. The system according to Note 7, wherein the step management unit manages attributes each indicating a type of step connectable to an upstream step, and the information processing apparatus further comprises a highlighting processing unit configured to, in response to an instruction to select a step arranged in the workflow and having an attribute indicative of being connectable to a downstream step, search for a downstream step that is already arranged in the workflow and connectable to the step based on a type of the step related to the instruction, and highlight the downstream step as a result of search.

Note 12. The system according to Note 7, further comprising:

a process management unit configured to store therein each of the processes and an attribute of the each of the processes in association with each other;

an attribute identifying unit configured to identify the attribute of the process to be executed by the workflow execution unit from the process management unit; and an execution control unit configured to control the execution of the workflow based on whether another process follows the process when the attribute identifying unit identifies a certain attribute.

Note 13. A non-transitory computer-readable storage medium with an executable program stored thereon, wherein the program instructs a computer to perform:

producing a workflow to be executed by combining steps each indicating a process, the steps being included in the workflow, each of the steps being associated with an attribute of the each of the steps;

displaying at least a step included in the workflow;

displaying an auxiliary indication corresponding to the attribute of a specified step in the workflow based on the attribute.

What is claimed is:

1. An information processing apparatus for generating a workflow including one or more steps each indicating a process to be executed, the apparatus comprising:

a workflow display unit configured to display, on a display, one or more graphical representations corresponding to one or more steps of the workflow;

a step management unit configured to obtain attribute data associated with a step to be added in response to an instruction for adding the step to the workflow; and an auxiliary indication control unit configured to cause the display to display a graphical representation corresponding to the step to be added and a graphical representation that reflects the attribute data, wherein the auxiliary indication control unit is further configured to:

determine whether the attribute data of the step to be added includes connectivity information indicating connectivity of the step to be added to a further step, display the graphical representation that reflects the attribute data only when the connectivity information indicates that the step to be added is connectable to the further step, determine whether the connectivity information of the attribute data of the step further indicates whether the step to be added is required to be connected to the further step, display an extendible line indicating that the step to be added is required to be connected to the further step when the connectivity information indicates that the step to be added is required to be connected to the further step, and display a point indicating that the step to be added can be connected to the further step when the connectivity information indicates that the step to be added can be connected to the further step but is not required to be connected to the further step.

2. The information processing apparatus of claim 1, wherein, when the one or more steps of the workflow are classified into a plurality of groups such that the one or more graphical representations corresponding to the one or more steps of the workflow are displayed in a plurality of areas on the display by group, the auxiliary indication control unit is further configured to:

determine whether the connectivity information further indicates that the step to be added is connectable to a further step belonging to the same group or that the step to be added is connectable only to a further step belonging to a different group; and control extension of the extendible line based on the connectivity information such that, when the connectivity information indicates that the step to be added is connectable to the further step belonging to the same group, the extendible line extends only within an area in which the graphical representation corresponding to the step to be added is displayed, and when the connectivity information indicates that the step to be added is only connectable to the further step belonging to the different group, the extendible line extends over the area in which the graphical representation corresponding to the step to be added is displayed.

3. The information processing apparatus of claim 1, further comprising:

a connection processing unit configured to, in response to an instruction for connecting a first step to a second step in the workflow, the first step being associated with attribute data indicating that the first step is connectable to a further step:

obtain attribute data associated with the second step, the association data of the second step including connectivity information indicating connectivity of the second step to a further step and type information indicating a type of a preceding step that is connectable to the second step;

determine whether the second step is connectable to the first step based on the attribute data of the second step; and display, on the display, a graphical representation that reflects connection between the first step and the second step, based on determination indicating that the second step is connectable to the first step.

4. The information processing apparatus of claim 1, further comprising:

a highlighting processing unit configured to, in response to an instruction for selecting a second step that is connectable to a first step in the workflow, the first step being associated with attribute data indicating that the first step is connectable to a further step:

obtain, for each one of the one or more steps in the workflow other than the first step, attribute data including type information indicating a type of a preceding step that is connectable to each step;

determine whether each one of the one or more steps in the workflow other than the first step is connectable to the first step based on the type information of the attribute data to identify at least one second step; and change display of the graphical representation corresponding to the at least one second step that is determined to be connectable to the first step.

5. A workflow generating system for generating a workflow including one or more steps each indicating a process to be executed, the system comprising:

a server apparatus including a first processor, the first processor being one or more processors; and a client apparatus including a second processor, the second processor being one or more processors, wherein at least one of the first processor and the second processor is configured to:

display, on a display, one or more graphical representations corresponding to one or more steps of a workflow;

obtain attribute data associated with a step to be added in response to an instruction for adding the step to the workflow;

display, on the display, a graphical representation corresponding to the step to be added and a graphical representation that reflects the attribute data;

determine whether the attribute data of the step to be added includes connectivity information indicating connectivity of the step to be added to a further step;

display, on the display, the graphical representation that reflects the attribute data only when the connectivity information indicates that the step to be added is connectable to the further step;

determine whether the connectivity information of the attribute data of the step further indicates whether the step to be added is required to be connected to the further step;

display, on the display, an extendible line indicating that the step to be added is required to be connected to the further step when the connectivity information indicates that the step to be added is required to be connected to the further step; and display, on the display, a point indicating that the step to be added can be connected to the further step when the connectivity information indicates that the step to be added can be connected to the further step but is not required to be connected to the further step.

6. The workflow generating system of claim 5, wherein at least one of the first processor and the second processor is configured to:
classify the one or more steps of the workflow into a plurality of groups such that the one or more graphical representations corresponding to the one or more steps of the workflow are displayed in a plurality of areas on the display by group;
determine whether the connectivity information further indicates that the step to be added is connectable to a further step belonging to the same group or that the step to be added is connectable only to a further step belonging to a different group; and
control extension of the extendible line based on the connectivity information, wherein
when the connectivity information indicates that the step to be added is connectable to the further step belonging to the same group, the extendible line extends only within an area in which the graphical representation corresponding to the step to be added is displayed, and
when the connectivity information indicates that the step to be added is only connectable to the further step belonging to the different group, the extendible line extends over the area in which the graphical representation corresponding to the step to be added is displayed.

7. The workflow generating system of claim 5, wherein at least one of the first processor and the second processor is configured to:
receive an instruction for connecting a first step to a second step in the workflow, the first step being associated with attribute data indicating that the first step is connectable to a further step;
obtain attribute data associated with the second step, the association data of the second step including connectivity information indicating connectivity of the second step to a further step and type information indicating a type of a preceding step that is connectable to the second step;
determine whether the second step is connectable to the first step based on the attribute data of the second step; and
display, on the display, a graphical representation that reflects connection between the first step and the second step, based on determination indicating that the second step is connectable to the first step.

8. The workflow generating system of claim 5, wherein at least one of the first processor and the second processor is configured to:
receive an instruction for selecting a second step that is connectable to a first step in the workflow, the first step being associated with attribute data indicating that the first step is connectable to a further step;
obtain, for each one of the one or more steps in the workflow other than the first step, attribute data including type information indicating a type of a preceding step that is connectable to each step;
determine whether each one of the one or more steps in the workflow other than the first step is connectable to the first step based on the type information of the attribute data to identify at least one second step; and
change display of the graphical representation corresponding to the at least one second step that is determined to be connectable to the first step.

9. The workflow generating system of claim 5, wherein at least one of the first processor and the second processor is configured to:
execute the workflow to cause one or more information processing apparatuses to perform the one or more steps of the workflow.

10. A method of generating a workflow including one or more steps each indicating a process to be executed, the method comprising:
displaying, on a display, one or more graphical representations corresponding to one or more steps of a workflow;
receiving an instruction for adding a step to the workflow;
displaying, on the display, a graphical representation corresponding to the step to be added and a graphical representation that reflects attribute data, the attribute data being associated with the step to be added;
determining whether the attribute data of the step to be added includes connectivity information indicating connectivity of the step to be added to a further step;
displaying, on the display, the graphical representation that reflects the attribute data only when the connectivity information indicates that the step to be added is connectable to the further step;
determining whether the connectivity information of the attribute data of the step further indicates whether the step to be added is required to be connected to the further step;
displaying, on the display, an extendible line indicating that the step to be added is required to be connected to the further step when the connectivity information indicates that the step to be added is required to be connected to the further step; and
displaying, on the display, a point indicating that the step to be added can be connected to the further step when the connectivity information indicates that the step to be added can be connected to the further step but is not required to be connected to the further step.

11. The method of claim 10, wherein, when the one or more steps of the workflow are classified into a plurality of groups and displayed in a plurality of areas on the display by group and the connectivity information further indicates that the step to be added is connectable to a further step belonging to the same group or that the step to be added is connectable only to a further step belonging to a different group, displaying the extendible line includes extending the extendible line such that:
when the step to be added is connectable to the further step belonging to the same group, the extendible line extends only within an area in which the graphical representation corresponding to the step to be added is displayed, and
when the step to be added is only connectable to the further step belonging to the different group, the extendible line extends over the area in which the graphical representation corresponding to the step to be added is displayed.

12. The method of claim 10, further comprising:
receiving an instruction for connecting a first step to a second step in the workflow, the first step being associated with attribute data indicating that the first step is connectable to a further step; and
displaying, on the display, a graphical representation that reflects connection between the first step and the second step, based on determination indicating that the second step is connectable to the first step, wherein the determination is based on attribute data of the second step including connectivity information indicating connectivity of the second step to a further step and type information indicating a type of a preceding step that is connectable to the second step.

13. The method of claim 10, further comprising:

receiving an instruction for selecting a second step that is connectable to a first step in the workflow, the first step being associated with attribute data indicating that the first step is connectable to a further step; and changing display of the graphical representation corresponding to at least one second step that is determined to be connectable to the first step, wherein the determination is based on whether each one of the one or more steps in the workflow other than the first step is connectable to the first step based on attribute data associated with each step to identify at least one second step, the attribute data of each step including type information indicating a type of a preceding step that is connectable to each step.

14. The method of claim 10, further comprising:

obtaining the attribute data associated with the step to be added in response to the instruction for adding the step to the workflow.

\* \* \* \* \*